United States Patent
Bhardwaj

(10) Patent No.: US 12,301,101 B2
(45) Date of Patent: May 13, 2025

(54) METHODS AND APPARATUS TO COMPENSATE FOR POWER FACTOR LOSS USING A PHASOR CANCELLATION BASED COMPENSATION SCHEME

(71) Applicant: Texas Instruments Incorporated, Dallas, TX (US)

(72) Inventor: Manish Bhardwaj, Sugarland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/745,317

(22) Filed: Jun. 17, 2024

(65) Prior Publication Data
US 2024/0339925 A1   Oct. 10, 2024

Related U.S. Application Data

(63) Continuation of application No. 18/302,848, filed on Apr. 19, 2023, now Pat. No. 12,051,969, which is a continuation of application No. 17/326,553, filed on May 21, 2021, now Pat. No. 11,658,564, which is a continuation of application No. 17/029,317, filed on Sep. 23, 2020, now Pat. No. 11,050,344, which is a
(Continued)

(51) Int. Cl.
*H02M 1/42* (2007.01)
*H02M 7/217* (2006.01)

(52) U.S. Cl.
CPC ....... *H02M 1/4208* (2013.01); *H02M 1/4233* (2013.01); *H02M 7/217* (2013.01)

(58) Field of Classification Search
CPC ... H02M 1/4208; H02M 1/4233; H02M 7/217
See application file for complete search history.

(56) References Cited

U.S. PATENT DOCUMENTS 7,495,410 B2   2/2009   Zargari et al.
8,508,166 B2   8/2013   Marcinkiewicz et al.
(Continued)

OTHER PUBLICATIONS

Van De Sype et al., "Duty-Ratio Feedforward for Digitally Controlled Boost PFC Converters," IEEE, 2003, 7 pages.
(Continued)

*Primary Examiner* — Rafael O De Leon Domenech
(74) *Attorney, Agent, or Firm* — Xianghui Huang; Frank D. Cimino

(57) ABSTRACT

Example power factor correction circuits to correct the power factor of power converters are disclosed. An example power factor correction controller circuit includes a phase locked loop phase angle determiner to determine a first phase angle of an input voltage of the power converter and further includes a compensating current determiner to determine, based on the phase angle, a compensating current to compensate for a capacitive current introduced by at least one filter capacitor of the power converter. The power factor correction controller circuit further includes a switch controller to cause a controlled current drawn by a power stage of the power converter to be adjusted by the compensating current to reduce a phase offset between the first phase angle of the input voltage and a second phase angle of the input current drawn at an input of the power converter.

20 Claims, 9 Drawing Sheets

Related U.S. Application Data continuation of application No. 16/029,306, filed on Jul. 6, 2018, now Pat. No. 10,797,589.

(60) Provisional application No. 62/564,307, filed on Sep. 28, 2017.

(56) References Cited

U.S. PATENT DOCUMENTS

| | | |
|---|---|---|
| 8,810,182 B2 | 8/2014 | Zhou et al. |
| 9,240,733 B2 | 1/2016 | Royak et al. |
| 9,294,005 B2 | 3/2016 | Tallam |
| 9,318,944 B2 | 4/2016 | Royak et al. |
| 9,362,839 B2 | 6/2016 | Wei et al. |
| 9,461,559 B2 | 10/2016 | Patel et al. |
| 9,948,207 B2 | 4/2018 | Inzunza Figueroa et al. |
| 10,158,299 B1 | 12/2018 | Wei et al. |
| 2003/0147191 A1 | 8/2003 | Deng et al. |
| 2007/0036212 A1 | 2/2007 | Leung et al. |
| 2008/0180055 A1 | 7/2008 | Zargari et al. |
| 2008/0205096 A1 | 8/2008 | Lai et al. |
| 2010/0026208 A1 | 2/2010 | Shteynberg et al. |
| 2013/0170256 A1 | 7/2013 | Choi et al. |
| 2014/0306763 A1 | 10/2014 | Hong et al. |
| 2017/0302161 A1 | 10/2017 | Green |
| 2018/0316260 A1 | 11/2018 | Beinlich |
| 2019/0260287 A1 | 8/2019 | Son et al. |
| 2019/0288539 A1 | 9/2019 | Vela Garcia |
| 2020/0313545 A1* | 10/2020 | Takegami ............ G01R 31/016 |

OTHER PUBLICATIONS

Bhardwaj et al., "Improving Light Load Power Factor for GaN Based Totem Pole Bridgeless PFC using Digital Phase Locked Loop Based Vector Cancellation & Tracking Error Compensation," IEEE Applied Power Electronics Conference and Exposition, Mar. 4-8, 2018, pre-publication version, 6 pages.

* cited by examiner

DUTY-RATIO FEED FORWARD (DFF)
CONTROL I$_{rms}$ = 0.5368 AMPS

DFF WITH CAPACITOR COMPENSATING
CURRENT CONTROL I$_{rms}$ = 0.4118 AMPS

DFF WITH CAPACITOR COMPENSATING CURRENT AND TRACKING
ERROR COMPENSATION CONTROL I$_{rms}$ = 0.2983 AMPS

| Vin | POWER | WITHOUT CAP COMPENSATION | WITH CAP COMPENSATION $i_{cap\_comp} = 0.04$ | PF IMPROVEMENT |
|---|---|---|---|---|
| 230 | 90W | 0.534 | 0.76 | 22.6% |
| 230 | 215W | 0.8654 | 0.95 | 8.46% |
| 230 | 413W | 0.93 | 0.985 | 5.5% |
| 230 | 617W | 0.973 | 0.991 | 1.8% |

METHODS AND APPARATUS TO COMPENSATE FOR POWER FACTOR LOSS USING A PHASOR CANCELLATION BASED COMPENSATION SCHEME

RELATED APPLICATIONS

This patent is a continuation of U.S. patent application Ser. No. 18/302,848, filed Apr. 19, 2023, which is a continuation of U.S. patent application Ser. No. 17/326,553, filed May 21, 2021, now U.S. Pat. No. 11,658,564, issued May 23, 2023, which is a continuation of U.S. patent application Ser. No. 17/029,317, filed Sep. 23, 2020, now U.S. Pat. No. 11,050,344, issued Jun. 29, 2021, which is a continuation of U.S. patent application Ser. No. 16/029,306, filed Jul. 6, 2018, now U.S. Pat. No. 10,797,589, issued Oct. 6, 2020, which claims priority to U.S. Provisional Patent Application No. 62/564,307, filed Sep. 28, 2017, titled "Phasor Cancellation Based X-CAP PF Loss Compensation Scheme for Power Factor Correction Circuits," all of which are hereby incorporated herein by reference in their entireties.

FIELD OF THE DISCLOSURE

This disclosure relates generally to power factor correction circuits/systems and, more particularly, methods and apparatus to compensate for power factor loss using a phasor cancellation based compensation scheme.

BACKGROUND

Electromagnetic interference (EMI) filters are often used with electricity delivery systems to attenuate (and provide immunity to) high frequency noise. Such EMI filters typically employ X-capacitors (X-cap(s)). X-caps are safety capacitors that are positioned "across the line" of an AC power source as opposed to being positioned between "line and ground." With the advent of new power factor correction (PFC) topologies, such as totem pole PFC, the X-cap is in parallel with (and assists) an input capacitor(s) to attenuate ripple caused by the switching action of an AC/DC rectifier circuit.

SUMMARY

The methods and apparatus disclosed herein relate generally to power factor correction. An example power factor correction (PFC) controller circuit for a power converter, disclosed herein includes a software phase locked loop phase angle determiner to determine a first phase angle of an input voltage of the power converter, and a compensating current determiner to determine, based on the phase angle, a compensating current to compensate for a capacitive current introduced by filter capacitors of the power converter. The PFC controller circuit further includes a switch controller to cause a controlled current drawn by a power stage of the power converter to be adjusted based on the compensating current to reduce a phase offset between the first phase angle of the input voltage and a second phase angle of an input current drawn at an input of the power converter.

An example power factor correction method for a power converter includes determining, with a software phase locked loop phase angle determiner, a phase angle of an input voltage of the power converter, and calculating, by executing an instruction with a processor, and, based on the phase angle, a compensating current to compensate for a capacitive current introduced by capacitors of an input filter of the power converter. The method further includes controlling, by executing an instruction with a processor, switches of a power stage of the power converter, the controlling of the switches to cause a controlled current drawn by the power stage to be adjusted based on the compensating current to improve a power factor of the power converter.

An example non-transitory computer readable medium includes instructions that, when executed by at least one processor, cause the at least one processor to at least determine a phase angle of an input voltage of a power converter, and calculate, based on the phase angle, a compensating current to compensate for a capacitive current introduced by capacitors of the power converter. In addition, the instructions cause the at least one processor to control switches of a half-bridge switching circuit based on the compensating current, the control of the switches to cause a controlled current drawn by the half-bridge switching circuit to be adjusted based on the compensating current to improve a power factor of the power converter.

These and other example methods, apparatus, systems and articles of manufacture to implement a phasor cancellation based X-cap and tracking error power factor loss compensation scheme for voltage converter circuits are disclosed in greater detail below.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
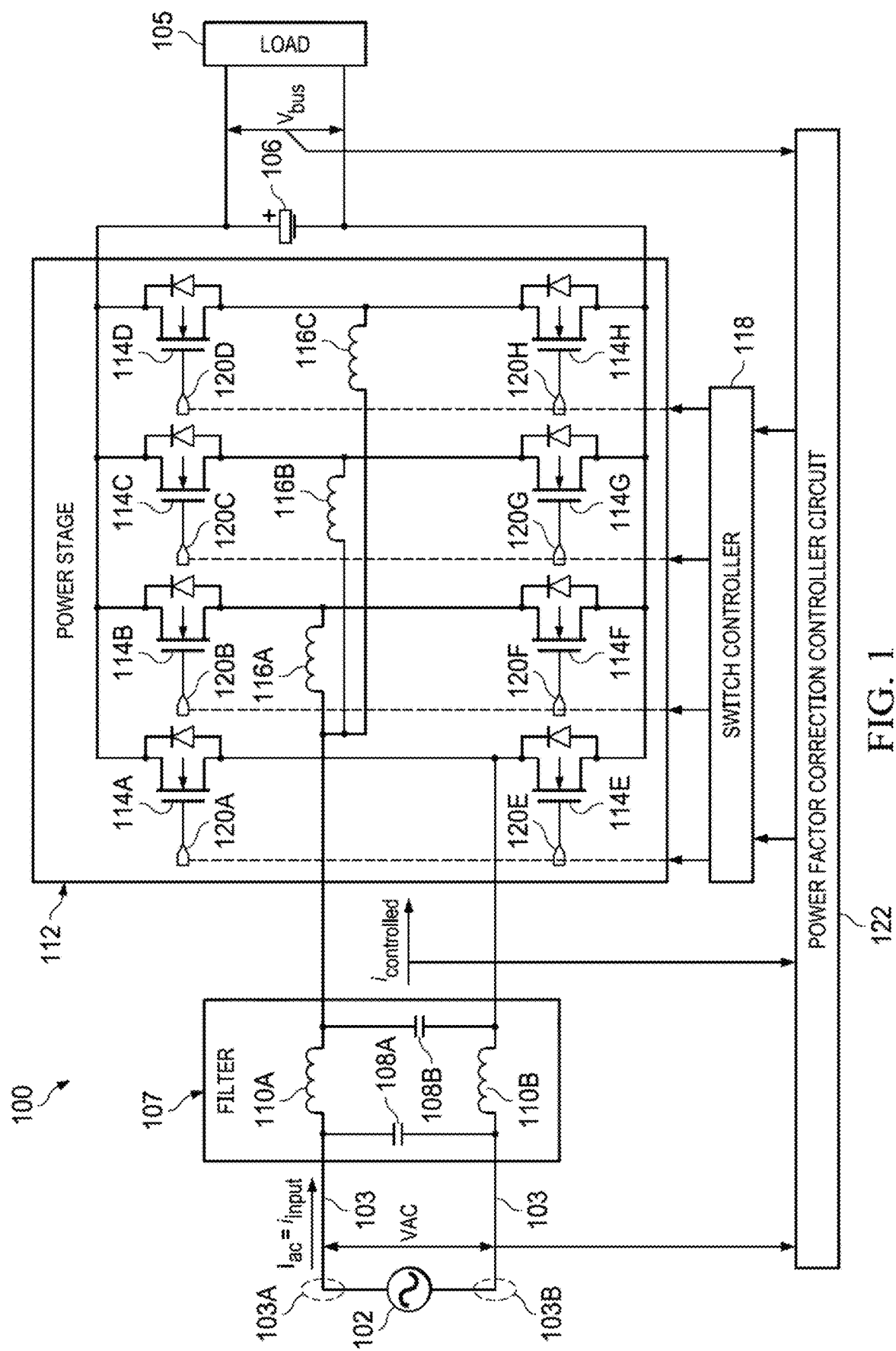
FIG. 1 is a block diagram of an example power factor correction converter system including an example filter, an example AC input voltage source, an example power stage, an example input capacitor, an example switcher controller, and an example power factor correction controller circuit.

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Although the following discloses example methods and apparatus, it should be noted that such methods and apparatus are merely illustrative and should not be considered as limiting. The example circuits described herein may be implemented using discrete components, integrated circuits (ICs), or any combination thereof.

Additionally, it is contemplated that any form of logic or circuitry may be used to implement portions of apparatus or methods herein. Logic or circuitry may include, for example, circuit implementations that are made exclusively in dedicated hardware (e.g., circuits, transistors, logic gates, hard-coded processors, programmable array logic (PAL), application-specific integrated circuits (ASICs), etc.), exclusively in software, exclusively in firmware, or some combination of hardware, firmware, and/or software. Accordingly, while the following describes example methods and apparatus, persons of ordinary skill in the art will readily appreciate that the examples are not the only way to implement such apparatus.

Power system designers often employ filters having one or more X-capacitors to attenuate high frequency noise of an electrical signal supplied to a power-consuming load and/or to reduce power signal distortion caused by electromagnetic interference. In newer power factor correction (PFC) topologies, such as totem pole PFC, an X-capacitor (X-cap) is also used to play a role in attenuating signal ripple caused by rapid switching of a rectifying circuit. As described above, X-caps are safety capacitors positioned "across the line" of an AC power source as opposed to being positioned between "line and ground." To maximize the noise attenuating characteristics of such filters, the X-caps currently being employed are larger than were previously used in conventional PFC circuits. Though greater noise attenuation is achieved, the larger sized X-caps are causing the power circuits to incur higher power factor losses. This issue is especially true at light loads. For example, at light load, the overall amount of current drawn by the load is low but a greater percentage of the overall amount of current is capacitive due to the X-cap and an input capacitor, thereby causing the power factor to degrade.

A power factor for a power-consuming system (e.g., a circuit) is often expressed as a value ranging between 0 and 1.0 and represents a ratio of the real power to the apparent power supplied to the power consuming system. Real power refers to useful energy supplied to the system load and the apparent power refers to a combination of the real power and reactive power. Reactive power, in contrast to real power, is unwanted power as it does not provide useful energy to a power-consuming system. As a result, power system designers attempt to reduce the amount of reactive power supplied by a power-generating system to a power-consuming system. Typically, the reduction of reactive power is achieved using power factor correction circuits. A higher power factor indicates lower reactive power and higher operating efficiency for the power consuming device. The effects of the X-caps and output capacitors on power factor are further described below with reference to FIG. 1.

FIG. 1 is a block diagram of an example power factor correction (PFC) converter system 100. The PFC converter system 100 includes an example AC voltage generator 102 coupled between line 103A and neutral 103B of a bus 103. The AC generator 102 generates an AC input voltage ($V_{ac}$) between the line terminal 103A and the neutral terminal 103B and causes an example AC current ($i_{ac}$) to flow. The AC current ($i_{ac}$) is also referred to herein as an input current, $i_{input}$. The output of the PFC converter system 100 is a regulated DC output voltage ($V_{bus}$) which is connected to a load 105. An example output capacitor 106, coupled in parallel with the load 105 decreases the amount of voltage ripple induced in the DC output voltage, $V_{bus}$ due to the power ripple inherent in single phase converters.

The PFC converter system 100 also includes an example filter 107 that is also coupled to the line 103A and the neutral 103B of the bus 103. The filter 107 receives the input current, $i_{input}$, from the AC voltage generator 102 and operates to reduce electromagnetic interference that might otherwise adversely affect the input current, $i_{input}$, and the operation of the PFC converter system 100. In some examples, the filter 107 includes an example X-capacitor (X-cap) 108A, and an example input capacitor 108B coupled across the bus 103 (e.g., between the line 103A and the neutral 103B). The X-cap 108A is coupled at an input of the filter 107 and the input capacitor 108B is coupled at an output of the filter 107. The filter 107 also includes example first and second inductors 110A, 110B. The first inductor 110A is coupled in series with the line terminal 103A of the bus 103 and the second inductor 110B is coupled in series with the neutral terminal 103B of the bus 103. A set of outputs of the filter 107 are coupled via the line 103A and the neutral 103B to an example power stage 112. The power stage 112 converts the AC input voltage, $V_{ac}$, to the DC output voltage, $V_{bus}$, supplied to the load 105.

In some examples, the example power stage 112 includes eight example power switches, implemented using example field effect (FET) transistors 114A-114H (e.g., a first FET 114A, a second FET 114B, a third FET 114C, a fourth FET 114D, a fifth FET 114E, a sixth FET 114F, a seventh FET 114G and an eighth FET 114H), and three example inductors 116 (e.g., a first inductor 116A, a second inductor 116B, and a third inductor 116C) arranged in the manner illustrated in FIG. 1. As described above, the output capacitor 106, coupled to the output of the power stage 112, stores energy such that the ripple on the output bus voltage, $V_{bus}$, supplied to the load 105 is reduced.

A controlled current, $i_{controlled}$, as further described below, is drawn by the power stage 112 from the AC voltage generator 102. In some examples, the amount of controlled current, $i_{controlled}$, drawn by the power stage 112 is adjusted/controlled by an example power factor correction (PFC) controller circuit 122 in combination with the example switch controller 118. In some examples, the PFC controller circuit 122 supplies information to the switch controller 118 for use in operating/driving the eight example field effect (FET) transistors 114 (e.g., a first FET 114A, a second FET 114B, a third FET 114C, a fourth FET 114D, a fifth FET 114E, a sixth FET 114F, a seventh FET 114G and an eighth FET 114H), The manner in which the eight FETS 114 are driven operates to adjust/control the amount of controlled current, $i_{controlled}$, drawn by the power stage 112.

In some examples, the example switch controller 118 is implemented with a pulse width modulator. The example pulse width modulator 118 applies voltage to example gates 120A-120H (e.g., a first gate 120A, a second gate 120B, a third gate 120C, a fourth gate 120D, a fifth gate 120E, a sixth gate 120F, a seventh gate 120G, and an eighth gate 120H) of the example, respective FETS 114A-114H thereby causing the FETS 114A-114H to turn ON (enabling current flow) and OFF (disabling current flow). The ON/OFF status of the individual FETS 114A-114H, governs the route taken by the controlled current, $i_{controlled}$, through the power stage 112. In addition, the manner in which the voltage is applied to the gates 120A-120H by the pulse width modulator 118 determines the amount of time that each of the FETS 114A-114H conducts current (e.g., is turned "ON") thereby regulating the duty ratio of the power stage 112. The example pulse width modulator 118 adjusts the ON/OFF status of the individual FETS 114A-114H in a manner that controls the phase and the magnitude of the controlled current, $i_{controlled}$.

The duty-ratio/duty cycle corresponds to a ratio of a length (in time) of a cycle during which one of the power switches of the power stage 112 is ON/conducting, while other ones of the power switches are turned OFF (and includes some dead time during which none of the power switches are conducting), to the length (in time) of a full cycle. The duty cycle is the duration of time during which current is supplied to the output bus versus the total length (in time) of the cycle. An actual duty cycle/duty ratio controlled by the pulse width modulator 118 can vary based on which of several control methods are selected. In some examples, the example pulse width modulator 118 is configured to operate/control the power switches 114A-114H in a manner that achieves a desired duty-ratio.

Referring still to FIG. 1, to operate the example FETS 114A-114H of the example power stage 112, the pulse width modulator 118 changes the status of the FETS 114A-114H based on when the AC input voltage, $V_{ac}$, changes polarity (e.g., crosses the x-axis), the phase angle of the AC input voltage, $V_{ac}$, and an amount of current being drawn by the load 105. The flow of current through the power stage 112 results in the conversion of the AC input voltage, $V_{ac}$, to the DC output voltage, Thus. When the pulse width modulator 118 is not operating to drive the FETS 114A-114H, the average value of the DC voltage, $V_{bus}$, is equal to the peak value of the rectified AC generator input voltage, $V_{ac\_peak}$. Additionally and as described further below, the pulse width modulator 118 changes the status of the FETS 114A-114H in a manner that controls the magnitude and phase of the controlled current, $i_{controlled}$.

Figure 2A:
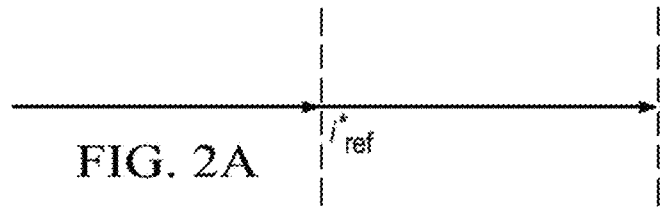
FIG. 2A is a graph illustrating an example relationship between a reference current, $i_{ref}$, used to control the flow of current delivered to the power stage of the power factor correction converter system of FIG. 1 and an AC input voltage, $V_{ac}$, generated by the example AC input voltage source of FIG. 1. As illustrated, the reference current is completely in phase with $V_{ac}$.

In some examples, the PFC controller circuit 122 is configured to determine a reference current, $i_{ref}$, used to adjust/control the amount of controlled current, $i_{controlled}$, drawn by the power stage 112. In some examples, the reference current, $i_{ref}$, is in-phase with the AC input voltage, $v_{ac}$. FIG. 2A is a graph illustrating an in-phase relationship between the reference current, $i_{ref}$, and the AC input voltage, var. As illustrated, the reference current, $i_{ref}$, has a same phase angle as the AC input voltage, $V_{ac}$ (e.g., the reference current, $i_{ref}$, does not contain any reactive components). In the time domain, the relationship between the magnitude of the reference current, $i^*_{ref}$, and the AC input voltage, $V_{ac}$, can be expressed as "$i_{ref}=i^*_{ref} \sin(\omega t)$," where "$V_{ac}=V_{ac\_peak} \sin(t)$" and "$V_{ac\_peak}$" is the peak magnitude of the AC input voltage, $V_{ac}$. As used herein "ω" represents frequency and "ωt" represents phase angle, "θ." In the graph of FIG. 2A, values that lie on the x-axis represent real values associated with real power and values that lie on the y-axis access represent imaginary values (e.g., associated with reactive power). As illustrated, when the reference current, $i_{ref}$, and the AC input voltage, $V_{ac}$, are in-phase both lie on the x-axis.

If the filter 107 were absent from the PFC converter system 100 of FIG. 1, and the switch controller 118 caused the controlled current, $i_{controlled}$, to be equal to the reference current, $i_{ref}$, then the input current, the reference current and the controlled current would all be equal (i.e., $i_{input}=i_{ref}=i_{controlled}$). As is typical, the power factor of the PFC converter system 100 is determined at the input of the PFC converter system 100 (e.g., at the output of the AC voltage generator 102 and before the input of the filter 107). Thus, in such an example (e.g., without the filter 107 and when the reference current, $i_{ref}$, and the controlled current, $i_{controlled}$, are equal), the PFC converter system 100 achieves a unity power factor (e.g., PF=1.0) because the input current, $i_{input}$, and the ac input voltage, $V_{ac}$, are in phase (have a same phase angle).

Typically, filters (such as the example filter 107) are used to reduce the effects of harmonics included in the input current, $i_{input}$. The filter 107, when included, draws current that is additive to the controlled current, $i_{controlled}$, drawn by the power stage 112. As a result, the input current is equal to the current drawn by the filter 107 and the controlled current, $i_{controlled}$, drawn by the power stage 112. As described above, the filter 107 includes reactive components (e.g., the example X-cap 108A, and the example input capacitor, 108B and the example first and second inductors 110A, 110B) which cause the current drawn by the filter 107 to include non-real components that degrade the power factor of the PFC converter system 100. For descriptive purposes, the current drawn by the filter 107 is referred to as the capacitor current, $i_{cap}$. The capacitor current, $i_{cap}$, is 90 degrees out of phase with both the AC input voltage, $V_{ac}$, and the reference current, $i_{ref}$. Thus, when the filter 107 is included in the PFC converter system 100, the input current (expressed in the time domain) is represented as "$i_{input}=i*_{ref} \sin(\omega t)+i_{cap}\cos(\omega t)$," where "$i_{cap}\cos(\omega t)$" is the time domain representation of the current introduced by the effective capacitance of the X-cap 108A, and the input capacitor 108B and "$i*_{ref}\sin(\omega t)$" represents the reference current drawn by the power stage. As described above, the switch controller 118 is assumed to cause the reference current, $i_{ref}$, to be completely in-phase with and equal to the controlled current, $i_{controlled}$, drawn by the power stage 112 (i.e., it is assumed that the bandwidth of the switch controller 118 is sufficient to track the reference current, $i_{ref}$).

Figure 2B:
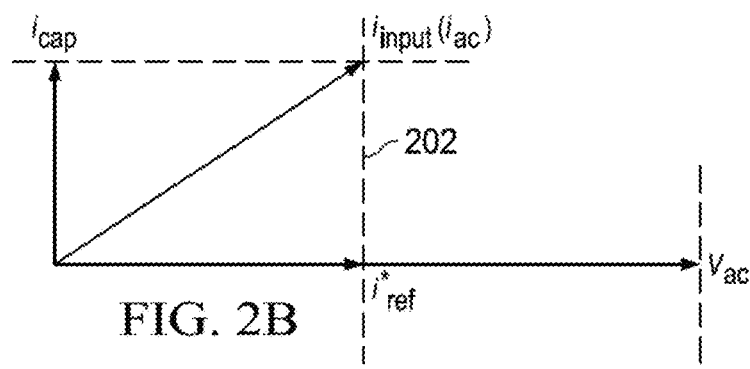
FIG. 2B is a graph illustrating an example relationship between the reference current, $i_{ref}$, when it is exactly in phase with the AC input voltage, $V_{ac}$, and a capacitor current associated with the capacitance seen at the input of the example power factor correction converter system of FIG. 1 and further illustrates the impact of the capacitor current on an input current, $i_{input}$, drawn at the input of the example power factor correction converter system of FIG. 1.

FIG. 2B is a graph illustrating an example impact of the capacitor current, $i_{cap}$, on the input current, $i_{input}$. As illustrated, the capacitor current, $i_{cap}$, lies on the y-axis of the graph of FIG. 2B and is, thus, 100% reactive. As further illustrated, due to the introduction of the reactive component of the capacitor current, $i_{cap}$, the input current, $i_{input}$, extends into the first quadrant 202 of the graph (e.g., the area of the graph including positive x-axis values and positive y-axis values). As such, the input current, $i_{input}$, is not in-phase with the AC input voltage, $V_{ac}$, and, thus, there is a phase offset between the input current, $i_{input}$, and the AC input voltage, $V_{ac}$.

As the input current, $i_{input}$, is not in phase with the AC input voltage, $V_{ac}$, a unity power factor is not achieved by the PFC converter system 100. Thus, the introduction of a filter (such as the filter 107) as well as the inclusion of the output capacitor 106 to an AC/DC converter (such as the PFC converter system 100) causes the power factor to degrade. In addition, the power factor typically degrades further (e.g., drops lower) as a load (such as the load 105) driven by the PFC converter system 100 lightens. In many instances, AC/DC converters (such as the PFC converter system 100) arranged to include a filter (such as the filter 107) fail to meet device specifications that require a power factor of greater than 95% when the load 105 is light (e.g., when the load 105 is between 10% and 20% of full load).

Figure 2C:
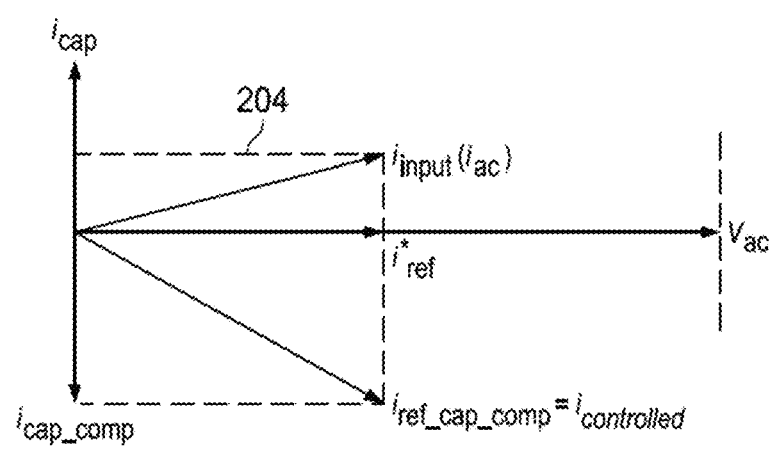
FIG. 2C is a graph illustrating an example relationship between the reference current, $i_{ref}$, the capacitor current, a compensating capacitor current, a resultant effective reference current, and a resultant effect on the input current, $i_{input}$, drawn at the input of the power factor correction converter system of FIG. 1.

To correct the power factor degradation introduced by the filter 107 and output capacitor 106, the PFC controller circuit 122 seeks to adjust the controlled current, $i_{controlled}$, in a manner that causes a reduction in the phase offset between the input current, $i_{input}$, and the AC input voltage, $V_{ac}$, which causes the input current, $i_{input}$, to be in phase (or nearly in phase) with the AC input voltage, $V_{ac}$. To determine an amount by which to adjust the controlled current, $i_{controlled}$, the PFC controller circuit 122 determines a capacitor compensating current, $i_{cap\_comp}$, to offset (e.g., compensate for) the effects of the current introduced by the X-cap capacitor 108A and the input capacitor 108B. In addition, the PFC controller circuit 122 uses the capacitor compensating current, $i_{cap\_comp}$, to adjust the reference current, $i_{ref}$. The reference current, $i_{ref}$, adjusted by the capacitor compensating current, $i_{cap\_comp}$, is referred to as the capacitor compensated reference current, $i_{ref\_cap\_comp}$. The capacitor compensated reference current, $i_{ref\_cap\_comp}$, is then used by the switch controller 118 to adjust the controlled current, $i_{controlled}$. As a result of adjusting the controlled current, $i_{controlled}$, the input current, $i_{input}$, changes. FIG. 2C is a graph illustrating an example relationship between the unadjusted reference current, $i_{ref}$, and the capacitor current, $i_{cap}$, and the capacitor compensating current, $i_{cap\_comp}$. The graph of FIG. 2C further illustrates the impact of introducing the capacitor compensated reference current, $i_{ref\_cap\_comp}$, on the input current, $i_{input}$. (As with FIG. 2B, the relationship illustrated in FIG. 2C assumes the controlled current, $i_{controlled}$, is in phase with the reference current, $i_{ref}$.) As illustrated in FIG. 2C, adjusting the reference current, $i_{ref}$, based on the capacitor compensating current, $i_{cap\_comp}$, results in the capacitor compensated reference current, $i_{ref\_cap\_comp}$, which lies in the second quadrant 204 of the graph when the capacitor compensating current, $i_{cap\_comp}$, is less than the capacitor current, $i_{cap}$.

Referring still to FIG. 2C, the capacitor compensated reference current, $i_{ref\_cap\_comp}$, when added to the capacitor current, $i_{cap}$, causes the input current, $i_{input}$, to have a phase angle nearer to the phase angle of the AC input voltage, $V_{ac}$, than the phase angle of the input current, $i_{input}$, illustrated in FIG. 2B. Thus, the switch controller 118 attempts to adjust the controlled current, $i_{controlled}$, to be equal to the capacitor compensated reference current, $i_{ref\_cap\_comp}$, which serves to change the phase angle of the input current, $i_{input}$, and, as a result, improves the power factor achieved by the PFC converter system 100. The magnitude of the capacitor compensating current, $i_{cap\_comp}$, is equal to "$V_{rms}*\omega*1.414*C_{eff\_input}$" where "$\omega$" is the frequency of the AC input voltage, $V_{ac}$, and "$C_{eff\_input}$" is the effective input capacitance seen at the input of the PFC converter system 100. Note that power factor unity can be achieved if the capacitor compensating current, $i_{cap\_comp}$, is equal to the capacitor current, $i_{cap}$. However, the effective input capacitance, $C_{eff\_input}$, typically varies over time and has a set tolerance, such that perfect cancellation is typically not achievable. Nevertheless, adjusting the capacitor compensating current, $i_{cap\_comp}$, to account for capacitor current draw in the manner described herein significantly improves the power factor and enables the PFC converter system 100 to meet power factor specifications, even at light load.

Figure 2D:
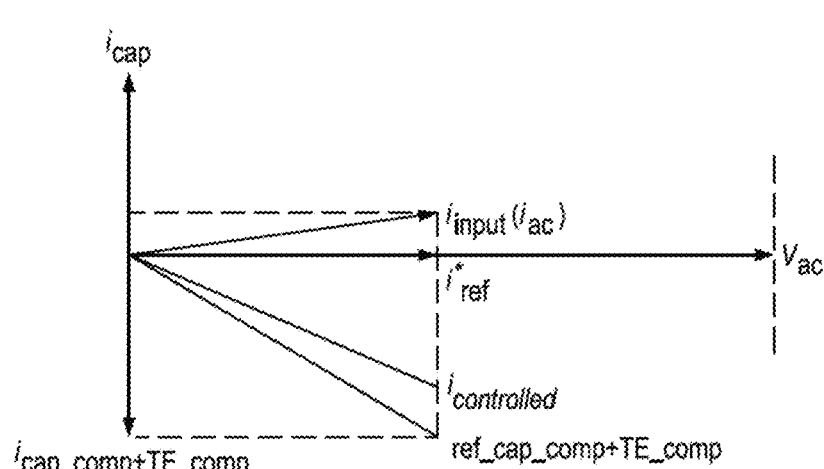
FIG. 2D is a graph illustrating an example relationship between the reference current, $i_{ref}$, the capacitor current, a further adjusted, compensating capacitor current, a resultant effective reference current, and the resulting effect, on the input current, $i_{input}$, drawn at the input of the power factor correction converter system of FIG. 1.

FIG. 2D is a graph illustrating an example condition in which the controlled current, $i_{controlled}$, does not track the reference current, $i_{ref}$. This condition arises when the PFC converter system 100 is operating at light load and is primarily attributed to the switch controller 118 having a lower bandwidth at light load. To compensate for this condition, referred to herein as a tracking error (TE), the capacitor compensating capacitor current, $i_{cap\_comp}$, is further adjusted by a tracking error compensating current that is dependent on load and line conditions (e.g., the value of the root mean square input voltage, $V_{rms}$, and the root mean square input current, $I_{rms}$). The magnitude of the tracking error compensating current is empirically determined for individual converters. In some examples, a value to be used to further adjust the capacitor compensating current is interpolated from a table (e.g., TABLE 1) populated with experimental data obtained by subjecting the PFC converter circuit 100 to different input voltage conditions, $V_{rms}$, and different load conditions (different $I_{rms}$ values). In response to subjecting the PFC converter circuit 100 to the different input voltages and load conditions, the value of the controlled current, $i_{controlled}$, is measured and stored in the table (e.g., TABLE 1). In TABLE 1, the values of $V_{rms}$ are shown in the first column and the values of $I_{rms}$ are shown in the top row.

TABLE 1

| $V_{rms}/I_{rms}$ | 0.01 | 0.02 | 0.04 | 0.1 | ... |
|---|---|---|---|---|---|
| 80 | $I_{TE\_comp1}$ | $I_{TE\_comp5}$ | $I_{TEr\_comp9}$ | $I_{TEr\_comp13}$ | $I_{TE\_comp17}$ |
| 100 | $I_{TE\_comp2}$ | $I_{TE\_comp6}$ | $I_{TE\_comp10}$ | $I_{TE\_comp14}$ | $I_{TE\_comp18}$ |
| 120 | $I_{TE\_comp3}$ | $I_{TE\_comp7}$ | $I_{TE\_comp11}$ | $i_{TE\_comp15}$ | $I_{TE\_comp19}$ |
| 140 | $I_{TE\_comp4}$ | $I_{TE\_comp8}$ | $i_{TE\_comp12}$ | $I_{TE\_comp16}$ | $I_{TE\_comp20}$ |

In some examples, the table is stored in memory accessible by the example PFC controller circuit 122. In operation, to determine the value of the tracking error compensation current, $I_{TE\_comp}$, the PFC controller circuit 122 uses the value of $V_{rms}$ as a first index and $I_{rms}$ as a second index to interpolate the value of the tracking error compensation current, $i_{TE\_comp}$. In some examples, when the measured value of $V_{rms}$ is between 80 and 100 but closer to 100, the value of $V_{rms}=100$ is used as a first index to access the table. The value of $I_{rms}$ is then used as a second index to access the table. In some examples, when the measured value of $I_{rms}$ is between 0.04 and 0.1, the value of the tracking error compensating current is determined by interpolating between $i_{TE\_comp10}$ and $i_{TE\_comp14}$.

The current that includes compensation for both the capacitor current and the tracking error current is referred to as the tracking error and capacitor compensated current and is denoted, "$i_{cap\_comp+TE\_comp}$," and compensates for the deleterious effects on the power factor caused by the capacitor current and the input capacitor current and further compensates for the power factor degradation caused by changes in the bandwidth of the switch controller 118 that are attendant to changes in an amount of current drawn by the load 105. As illustrated in FIG. 2D, using the tracking error and capacitor compensated current, $i_{cap\_comp+TE\_comp}$, to adjust the reference current, $i_{ref}$, results in a tracking error and capacitor compensated reference current, denoted $i_{ref\_cap\_comp+TE\_comp}$. The tracking error and capacitor compensated reference current, $i_{ref\_cap\_comp+TE\_comp}$, causes the controlled current, $i_{controlled}$, to be adjusted in the manner illustrated in FIG. 2D which thereby results in moving the input current, $i_{input}$, closer to the x-axis than the input current, $i_{input}$, illustrated in FIG. 2C. As the input current is closer to the x-axis, a further improved power factor is achieved in FIG. 2D than in FIG. 2C.

In some examples, as will be described in greater detail below, the PFC controller circuit 122 determines a difference between the tracking error and capacitor compensated reference current, $i_{ref\_cap\_comp+TE\_comp}$, and the actual controlled current, $i_{controlled}$, and supplies the difference information to the switch controller 118 for use in controlling the operation of the power stage 112. In some examples, the switch controller 118 attempts to minimize the difference between the controlled current, $i_{controlled}$, and the tracking error and capacitor compensated reference current, $i_{ref\_cap\_comp+TE\_comp}$, thereby causing the controlled current, $i_{controlled}$, to be equal to (or nearly equal to) the tracking error and capacitor compensated reference current, $i_{ref\_cap\_comp+TE\_comp}$. As a result of adjusting the controlled current, $i_{controlled}$, in the manner described, the phase angle of the input current, $i_{input}$, and the phase angle of the AC input voltage, $V_{ac}$, are brought into alignment (or near alignment) which improves the power factor achieved by the PFC converter system 100.

Figure 3:
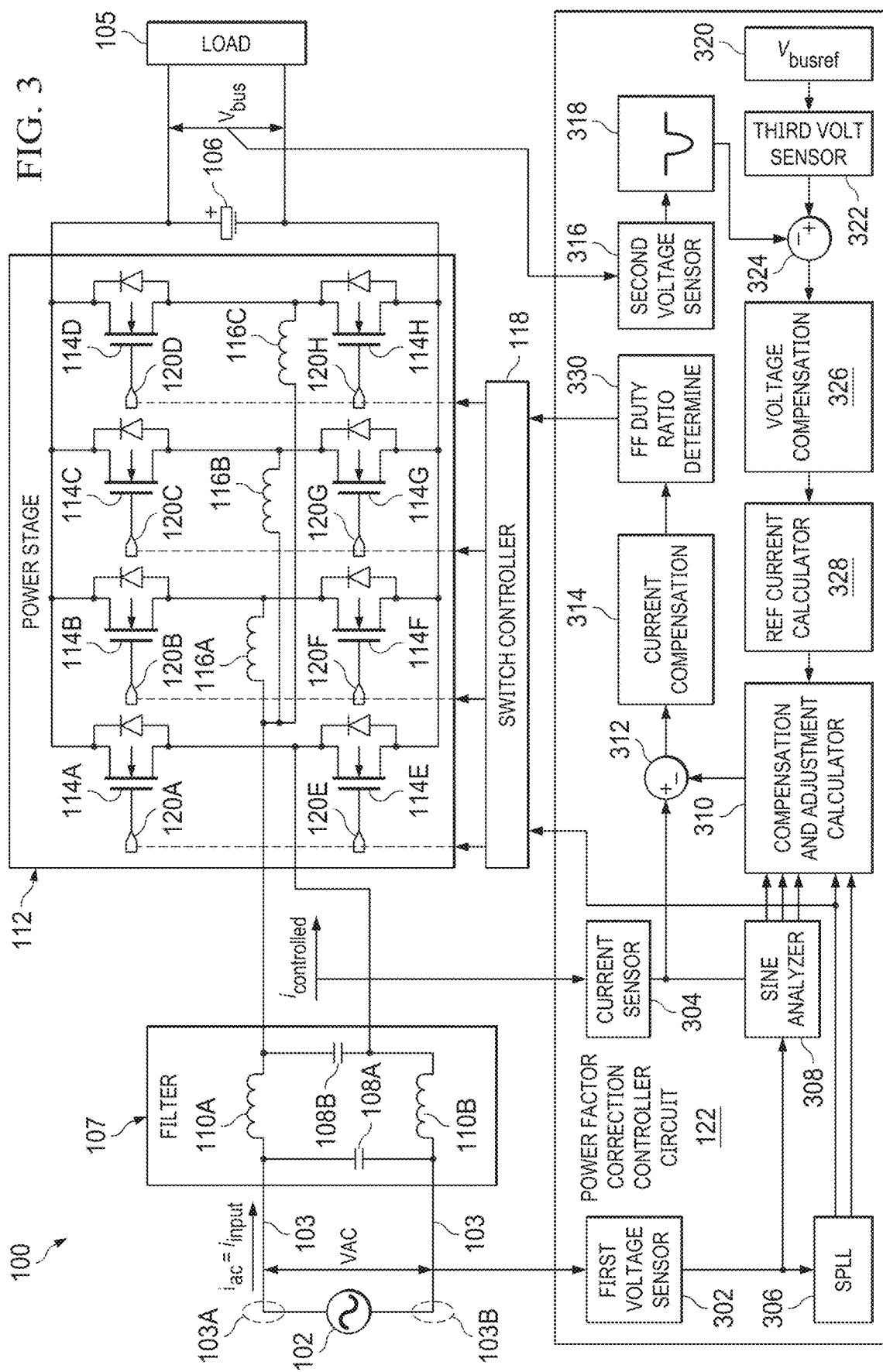
FIG. 3 is a block diagram of an example implementation of the power factor correction converter system of FIG. 1 showing example implementations of the example power factor correction controller circuit.

FIG. 3 illustrates an example implementation of the example PFC controller circuit 112 in the example PFC converter system 100 of FIG. 1. As described above, the PFC controller circuit 122 operates to determine a tracking error and capacitor compensated reference current, $i_{ref\_cap\_comp+TE\_comp}$, that offsets the reactive component of the input current, $i_{input}$, introduced by the example X-cap 108A and the input capacitor 108B, and that also compensates for the tracking error induced by the reduction in bandwidth of the current controller under light loads. Information about the tracking error and capacitor compensated reference current, $i_{ref\_cap\_comp+TE\_comp}$, is supplied to the switch controller 118 for controlling the operation of the power stage 112, and, more particularly, for use in adjusting the magnitude and phase angle of the controlled current, $i_{controlled}$. Adjusting the controlled current, $i_{controlled}$, in turn, causes the input current, $i_{input}$, to be in-phase or nearly in-phase with the AC input voltage, $V_{ac}$, thereby resulting in an improved power factor (even during times of light load).

As described in greater detail below, the sensed reference voltage, $V_{busref}$ is used to determine the magnitude of the reference current, $i^*_{ref}$. The magnitude of the reference current, $i^*_{ref}$, is then converted to a time domain reference signal, $i_{ref}$ that is adjusted to compensate for the capacitor current, $i_{cap}$, and to compensate for the low bandwidth of the switch controller 118 at light load.

The example PFC converter system 100 of FIG. 3 includes the example AC voltage generator 102, the example filter 107, the example power stage 112, the example switch controller 118, the example output capacitor 106, and the example PFC controller circuit 122. As described above, to operate the example FETS 114A-114H of the example power stage 112, the switch controller 118 changes the status of the power switches/FETS 114A-114H based on when the AC input voltage, $V_{ac}$, changes polarity (e.g., crosses the x-axis), the phase angle of the AC input voltage, $V_{ac}$, and an amount of current being drawn by the load 105. The flow of the controlled current, $i_{controlled}$, through the power stage 112 results in the conversion of the AC input voltage, $V_{ac}$, to the DC output voltage, $V_{bus}$. When the pulse width modulator 118 is not operating to drive the power switches 114A-114H, the average value of the DC voltage, $V_{bus}$, is equal to the peak value of the rectified AC generator input voltage, $V_{ac\_peak}$. Additionally and as described further below, the switch controller 118 changes the status of the FETS 114A-114H in a manner that causes the controlled current, $i_{controlled}$, drawn by the half-bridge switching circuit to equal (or nearly equal) the tracking error and capacitor compensated reference current, $i_{ref\_cap\_comp+TE\_comp}$, as determined by the PFC controller circuit 122.

Referring still to FIG. 3, in some examples, the PFC controller circuit 122 uses information sensed from the PFC converter system 100 (e.g., the sensed AC input voltage, $V_{ac}$, the sensed controlled current, $i_{controlled}$, and the sensed output voltage, $V_{bus}$) as well as a reference voltage, $V_{busref}$, that represents a desired output bus voltage. As described in greater detail below, the reference voltage, $V_{busref}$, is used to determine the magnitude of the reference current, $i^*_{ref}$. The magnitude of the reference current, $i^*_{ref}$, is then converted to a time domain signal and adjusted to compensate for the capacitor current, $i_{cap}$, and to compensate for the tracking error caused by changes in the amount of current drawn by the load 105 at different input voltage values, $V_{ac}$. The tracking error and capacitor compensated reference current, $i_{ref\_cap\_comp+TE\_comp}$, is then used by the switch controller 118 to operate the power switches 114A-114H of the power stage 112 in a manner that causes the controlled current, $i_{controlled}$, drawn by the power stage 112 to change. In some examples, the changes to the controlled current, $i_{controlled}$, cause the input current, $i_{input}$, to be in phase (or nearly in phase) with the AC input voltage, thereby resulting in a unity (or near unity) power factor, as described with reference to FIGS. 2C and 2D.

To determine an amount by which to adjust the magnitude of the reference current, $i^*_{ref}$, to compensate for the capacitor current, $i_{cap}$, the PFC controller circuit 122 uses a digital phase locked loop based vector cancellation (DPLLVC) technique to derive the capacitor compensating current, $i_{cap\_comp}$, (also referred to as a DPLLVC current) that, if applied to the reference current, $i_{ref}$, would compensate for the capacitor current, $i_{cap}$. The compensating current, $i_{cap\_comp}$, is one hundred and eighty degrees) (180° out of phase with the capacitor cap current, $i_{cap}$. In some examples, the magnitude of the reference current, $i^*_{ref}$, is adjusted by the capacitor compensating current, $i_{cap\_comp}$ to derive a capacitor compensated reference current $i_{ref\_cap\_comp}$. In addition, the capacitor compensated reference current, $i_{ref\_cap\_comp}$ is further adjusted to compensate for the tracking error which causes the controlled current, $i_{controlled}$, to be out of phase with the capacitor compensated reference current $i_{ref\_cap\_comp}$, especially at light loads where the bandwidth of the switch controller 118 may be low. The tracking error and capacitor compensated reference current, $i_{ref\_cap\_comp+TE\_comp}$, developed by the PFC controller circuit 122, can be used to compensate for the capacitor currents drawn by the X-cap 108A and the input capacitor 108B and for the tracking error caused by the switch controller 118 due to changes in the bandwidth of the switch controller 118 as the current drawn by the load 105 changes. In some examples, the PFC controller circuit 122 converts the tracking error and capacitor compensated reference current, $i_{ref\_cap\_comp+TE\_comp}$, to a time domain signal to arrive at $i_{ref\_cap\_comp+TE\_comp}$, and then subtracts the tracking error and capacitor compensated reference current, $i_{ref\_cap\_comp+TE\_comp}$, from the actual (i.e., measured) controlled current, $i_{controlled}$, to determine a difference current. Information identifying the difference current, $i_{diff}$ is supplied to the switch controller 118 which uses the information to control the power switches 114A-114H in a manner that adjusts the controlled current, $i_{controlled}$, to equal or nearly equal the tracking error and capacitor compensated reference current, $i_{ref\_cap\_comp+TE\_comp}$, thereby minimizing the difference current, $i_{diff}$. As the controlled current, $i_{controlled}$, becomes equal to the tracking error and capacitor compensated reference current, $i_{ref\_cap\_comp+TE\_comp}$, the input current, $i_{input}$, comes into phase with the AC input voltage, $V_{ac}$, thereby resulting in a desirable power factor (e.g., unity or near unity).

Referring still to FIG. 3, in some examples, the PFC controller circuit 122 includes an example first voltage sensor 302, an example current sensor 304, an example software phase locked loop (SPLL) determiner 306, an example sine analyzer 308, an example compensation and adjustment calculator 310, a first example subtractor 312, an example current compensator 314, an example second voltage sensor 316, an example notch filter 318, an example reference bus voltage source 320, a third example voltage sensor 322, a second example subtractor 324, an example voltage compensator 326, an example reference current calculator 328, and an example feed forward duty ratio determiner 330.

In some examples, the SPLL determiner 306 receives a voltage signal from the first voltage sensor 302. The first voltage sensor 302 includes a divider that divides the sensed voltage causing the output of the first voltage sensor 302 to represent the AC input voltage, $v_{ac}$, but scaled to a reduced magnitude that is appropriate for usage by the PFC controller circuit 122. The SPLL determiner 306 extracts the ac frequency ("ω"), and the phase angle ("ωt") (also represented as "θ") of the input voltage, $v_{ac}$. In some examples, the SPLL determiner 306 outputs this information as "sin (ωt)" and "cos (ωt)." In some examples, the SPLL determiner 306 is implemented as a second order generalized integrator (SOGI)-based phase locked loop that is able to lock the phase angle in a manner that filters out distortion, thereby making the technique suitable for distorted grid conditions and reducing the adverse effects of any voltage related noise on the input current, $i_{input}$. The SPLL determiner 306 supplies the results of both calculations to the compensation and adjustment calculator 310. The compensation and adjustment calculator 310 uses the results of both calculations to determine the tracking error and capacitor compensated reference current, $i_{ref\_cap\_comp+TE\_comp}$ in the manner described further below with reference to FIG. 4.

The example sine analyzer 308 receives the divided down ac voltage signal, $V_{ac}$, output from the example first voltage sensor 302 and receives a current signal output by the example current sensor 304. The current sensor 304 senses the actual (e.g., measured) controlled current, $i_{controlled}$, and divides the actual controlled current, $i_{controlled}$, thereby causing the output of the current sensor 304 to represent the actual controlled current, $i_{controlled}$, scaled to a reduced magnitude appropriate for usage by the PFC controller circuit 122. The sine analyzer 308 uses the reduced AC input voltage, $V_{ac}$, and the reduced controlled current, $i_{controlled}$, to determine a root mean square (rms) voltage value, $V_{rms}$, of the AC input voltage, $V_{ac}$, the rms value of the input current ($I_{rms}$), and the ac frequency (ω). The sine analyzer 308 supplies the $V_{rms}$ voltage value, $I_{rms}$ current value, and the ac frequency (ω) to the example compensation and adjustment calculator 310. In some examples, the value of the frequency, ω, can also be obtained from the SPLL determiner 306. As mentioned above, the compensation and adjustment calculator 310 uses the information to determine the tracking error and capacitor compensated reference current, $i_{ref\_cap\_comp+TE\_comp}$.

In addition to receiving input from the example SPLL determiner 306 and the example sine analyzer 308, the example compensation and adjustment calculator 310 also receives a value representing the magnitude of the reference current, $i^*_{ref}$. The magnitude of the reference current is calculated based on a sensed output voltage, $V_{bus}$ and a reference bus voltage, $V_{busref}$, sensed at the example reference bus voltage source 320. The actual output voltage, $V_{bus}$, is sensed by the example second voltage sensor 316 which includes a divider that divides the sensed, actual output voltage, $V_{bus}$, so that the output of the second voltage sensor 316 represents the actual output voltage, $V_{bus}$, reduced to a magnitude appropriate to usage by the PFC controller circuit 122. The sensed and divided output voltage, $V_{bus}$, is supplied by the second voltage sensor 316 to the example notch filter 318 which rejects a narrow frequency band but leaves the rest of the spectrum little changed. In some examples, the frequency band that is rejected contains a high degree of ripple noise (e.g., twice a grid frequency power ripple (2ω))) such that the removal of the band results in a more stable output signal. The output signal of the notch filter 318 is supplied to the example second subtractor 324. In addition, the reference voltage, $V_{busref}$, sensed by the example third voltage sensor 320 is also supplied to the second subtractor 324. The third voltage sensor also includes a divider to divide the sensed reference bus voltage $V_{busref}$ so that the output of the third voltage sensor 322 has a magnitude that is reduced appropriately for usage by the components of the PFC controller circuit 122. The second subtractor 324 subtracts the sensed, actual output bus voltage $V_{bus}$ from the sensed reference bus voltage $V_{busref}$ to determine an output bus voltage error. This output bus voltage error represents the difference between the actual value of the output bus voltage, $V_{bus}$, and the desired (reference) value of the output bus voltage, $V_{busref}$. The output bus voltage error is supplied to the example voltage compensator 326 which determines the power associated with the difference voltage between the actual output bus voltage, $V_{bus}$, and the reference output bus voltage, $V_{busref}$. In some examples, the voltage compensator 326 is implemented with an example proportional integral or proportional integral controller or similar structure. The power value determined by the voltage compensator 326 is supplied to the reference current calculator 328 which calculates the magnitude of the reference current, $i^*_{ref}$, by dividing the output of the voltage compensator 326 by "$V_N * K_{v\_gain}$". In some examples, the power is equal to "voltage*current" (e.g., v*i) such that the reference current calculator 328 divides the power value by the voltage $V_N$ to obtain the magnitude of the reference current, $i^*_{ref}$.

The magnitude of the reference current, $i^*_{ref}$, is supplied from an output of the example reference current calculator 328 to an input of the example compensation and adjustment calculator 310. The compensation and adjustment calculator 310 uses the calculated reference current value, $i^*_{ref}$, the outputs supplied by the example SPLL determiner 306, and the sine analyzer 308, as well as the knowledge of $1.414*C_{eff\_input}$ from design values to determine the compensating capacitor current, $i_{cap\_comp}$, to be used to adjust the reference current $i_{ref}$ and thereby offset the adverse effects of the capacitor current drawn by the X-cap 108A and the input capacitor 108B. In addition, the compensation and adjustment calculator 310 also uses the information of $I_{rms}$ and $V_{rms}$ (described above with respect to Table 1) to determine the empirically generated value by which to further adjust the magnitude of the reference current, $i^*_{ref}$, as described in greater detail below. The compensation and adjustment calculator 310 supplies the tracking error and capacitor compensated reference current, $i_{ref\_cap\_comp+TE\_comp}$, to the first example subtractor 312. The first subtractor 312 subtracts the tracking error and capacitor compensated reference current, $i_{ref\_cap\_comp+TE\_comp}$ from the divided down value of the sensed/measured, actual controlled current, $i_{controlled}$, provided by the example first current sensor 304 to obtain a difference between the actual, sensed controlled current, $i_{controlled}$, and the tracking error and capacitor compensated reference current, $i_{ref\_cap\_comp+TE\_comp}$. The difference is represented as a different current, $i_{diff}$, and is supplied to the example current compensator 314 which operates to ensure that the controlled current, $i_{controlled}$, follows the tracking error and capacitor compensated reference current, $i_{ref\_cap\_comp+TE\_comp}$ (i.e., the error between the controlled current, $i_{controlled}$, and the tracking error and capacitor compensated reference current, $i_{ref\_cap\_comp+TE\_comp}$, is small or zero).

The current compensator 314 supplies the compensated difference current, $i_{diff\_comp}$, to the example feed forward duty ratio determiner 330. The feed forward duty ratio determiner 330 uses any conventional method to determine an appropriate duty ratio at which to drive the example gates 120A-120H of the example FETs/power switches 114A-114H. The duty ratio used to drive the gates 120A-120H is determined such that the output bus voltage, $V_{bus}$, remains stable. The feed forward duty ratio determiner 330 further uses the compensated difference current, $i_{diff\_comp}$, to determine a duty ratio that, when used to drive the FETS/power switches 114A-114H, causes the controlled current, $i_{controlled}$, to equal (or nearly equal) the tracking error and capacitor compensated reference current, $i_{ref\_cap\_comp+TE\_comp}$. The feed forward duty ratio determiner 330 then supplies the determined duty ratio, to the switch controller/pulse width modulator (PWM) 118. The switch controller/PWM 118 uses the duty ratio information as well as the knowledge of the AC input voltage, $V_{ac}$, to drive the gates 120A-120H in a manner that causes the controlled current, $i_{controlled}$, to equal or nearly equal the tracking error and capacitor compensated reference current, $i_{ref\_cap\_comp+TE\_comp}$. As illustrated by FIG. 2D, causing the controlled current, $i_{controlled}$, to equal or nearly equal the tracking error and capacitor compensated reference current, $i_{ref\_cap\_comp+TE\_comp}$, causes the input current, $i_{input}$, to be in phase, or nearly in phase, with the AC input voltage, $V_{ac}$. As a result, with the aid of the PFC controller circuit 112, the power factor of the PFC converter system 100 is unity or nearly unity and the output voltage, Thus, supplied to the load 105 is stable.

Figure 4:
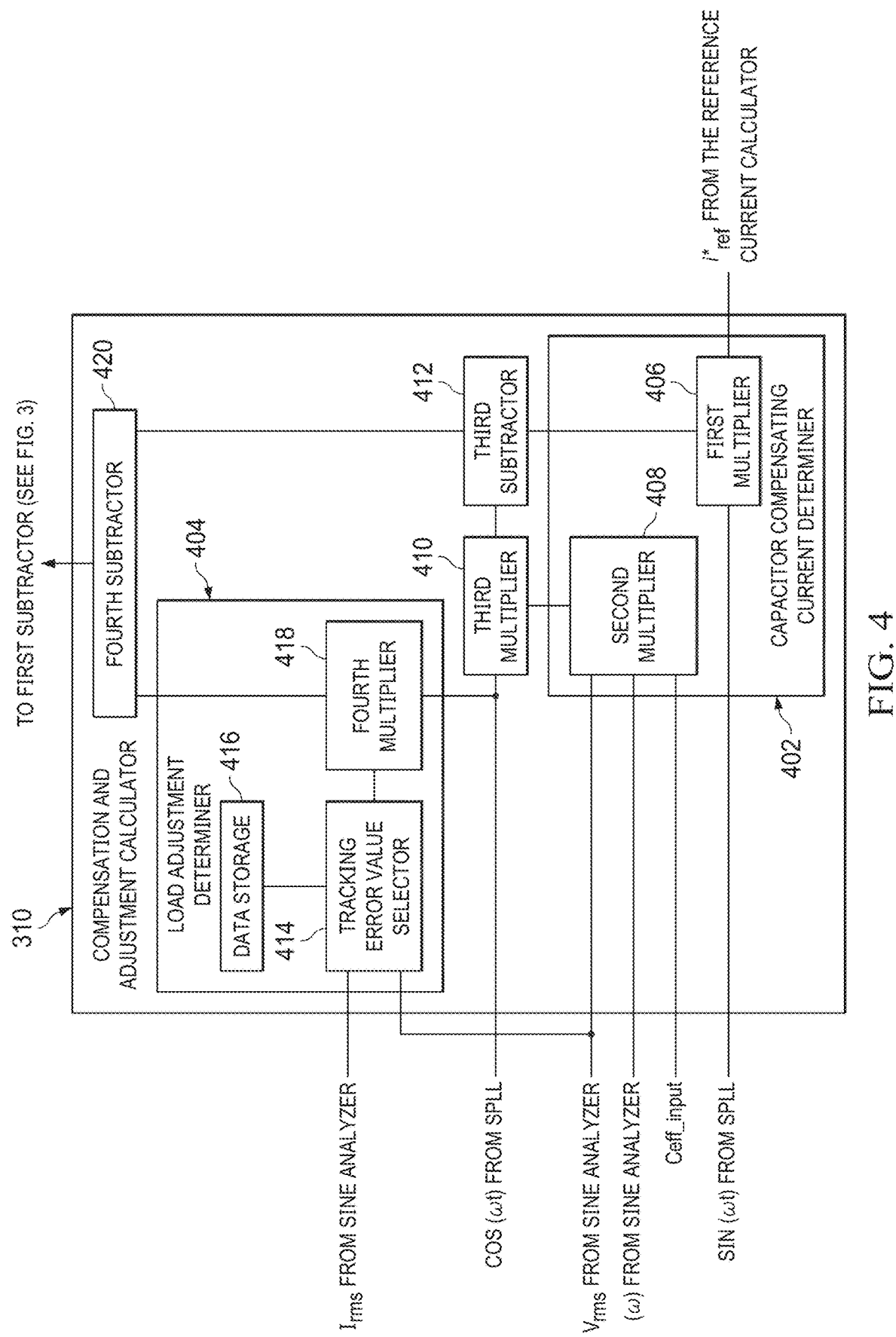
FIG. 4 is a block diagram of an example implementation of the compensation and adjustment calculator of the power factor correction controller circuit of FIG. 3.

FIG. 4 is an example block diagram of the example compensation and adjustment calculator 310 of FIG. 3. In some examples, the compensation and adjustment calculator 310 includes an example compensating current determiner 402 and an example load adjustment determiner 404. The compensating current determiner 402 receives the sin (ω) signal supplied by the output of the SPLL 306 and also receives the magnitude of the reference current, $i^*_{ref}$, from the reference current calculator 328 (see FIG. 3). An example first multiplier 406 of the compensating current determiner 402 multiplies the sin (ω) with the magnitude of the reference current, $i^*_{ref}$ to obtain a signal representing a time domain formatted version of the reference current $i_{ref}$. In addition, an example second multiplier 408 multiples the value of the root means square input voltage, $V_{rms}$, received from the sine analyzer 308, the value of the frequency (ω) received from the sine analyzer 308 (see FIG. 3) and the value of the effective input capacitance $C_{eff\_input}$, of the PFC converter 100 multiplied by the constant "1.414" to determine the value of the magnitude of the capacitor compensating current, $i_{cap\_comp}$. In some such examples, the value of the capacitor compensating current, $i_{cap\_comp}$, is equal to $V_{rms}*(ω)*1.414*C_{eff\_input}$." In some examples, the value of the effective input capacitance is based on the capacitance of the X-cap 108A and the input capacitor 108B (and any other capacitors included in the filter 107) and can be supplied by a user as an input to the PFC controller circuit or can be entered and stored in the PFC controller circuit 122 during manufacture. In some such examples, the value of "$1.414*C_{eff\_input}$" can be stored for usage by the compensating current determiner. The second multiplier 408 supplies the value of the capacitor compensating current, $i_{cap\_comp}$, to an example third multiplier 410. The third multiplier 410 multiplies the capacitor compensating current, $i_{cap\_comp}$, by a cos (ωt) signal received from the example sine analyzer 308 to thereby obtain the capacitor compensating current, $i_{cap\_comp}$, in the time domain. An example third subtractor 412 subtracts the capacitor compensating current, $i_{cap\_comp}$, (represented in the time domain) from the reference current, ire, (also represented in the time domain) to determine the value of the capacitor compensated reference current, $i_{ref\_cap\_comp}$.

Referring still to FIG. 4, in some examples, the example load adjustment determiner 404 includes an example tracking error data selector 414, an example data storage 416, and an example fourth multiplier 418. The example load adjustment determiner uses the values of $I_{rms}$ and $V_{rms}$ supplied by the sine analyzer 308 (see FIG. 3) in the manner described above with reference to Table 1 to select a tracking error data value from the data storage 416. In some such examples, the data storage 416 is used to store data showing how tracking error current changes with changes in the values of $V_{rms}$ and $I_{rms}$ (e.g., a table such as Table 1). The selected tracking error data value is supplied by the tracking error data selector 414 to the fourth multiplier 416 which multiplies the tracking error current value by a cos (ωt) signal received from the example sine analyzer 308 to determine the tracking error current, $i_{TE}$ in the time domain. In some examples, an example fourth subtractor 420 subtracts the value of the tracking error current, $i_{TE}$, from the value of the capacitor compensated reference current, $i_{ref\_cap\_comp}$, to determine the tracking error and capacitor compensated reference current, $i_{ref\_cap\_comp+TE\_comp}$ (e.g., $i_{ref\_cap\_comp} - I_{TE\_comp} = i_{ref\_cap\_comp+TE\_comp}$). The tracking error and capacitor compensated reference current, $i_{ref\_cap\_comp+TE\_comp}$, is also referred to as the effective reference current, $i_{ref\_eff}$ (e.g., the reference current after having been compensated for capacitance and tracking error).

The effective reference current, $i_{ref\_eff}$ is then supplied by the compensation and adjustment calculator 410 to the example first subtractor 312 as described above with reference to FIG. 3. As further described above, the effective reference current, $i_{ref\_eff}$ is subtracted from the actual (i.e., measured/sensed) controlled current, $i_{controlled}$, to derive the error (or difference) current, $i_{diff}$. As described above, the error/difference current (after being operated on by the example current compensator 314) is used by the switch controller/PWM 118 to control the switching of the FETS 114A-114H. The pulse width modulator 118 uses the error current to adjust the switching of the FETS 114A-114H in a manner that causes the error current (e.g., the difference between the actual controlled current, $i_{controlled}$, and the effective reference current, $i_{ref\_eff}$ to be minimized. In other words, the switch controller/PWM pulse width modulator 118 controls the power stage 112 in a manner that causes the controlled current, $i_{controlled}$, to equal or nearly equal the effective reference current, $i_{ref\_eff}$. When the controlled current $i_{controlled}$, is equal or nearly equal the effective reference current, $i_{ref\_eff}$, the input current, input, comes into phase alignment with the AC input voltage, $V_{ac}$, thereby resulting in a unity or nearly unity power factor.

While an example manner of implementing the PFC controller circuit 122 of FIG. 1 is illustrated in FIG. 3 and in FIG. 4, one or more of the elements, processes and/or devices illustrated in FIG. 3 and/or FIG. 4 may be combined, divided, re-arranged, omitted, eliminated and/or implemented in any other way. Further, the example first voltage sensor 302, the example current sensor 304, the example software phase locked loop (SPLL) determiner 306, the example sine analyzer 308, the example compensation and adjustment calculator 310, the first example subtractor 312, the example current compensator 314, the example second voltage sensor 316, the example notch filter 318, the example reference bus voltage source 320, the third example voltage sensor 322, the second example subtractor 324, the example voltage compensator 326, the example reference current calculator 328, the example feed forward duty ratio determiner 330, the example capacitor compensating current determiner 402, the example load adjustment determiner 404, the example first multiplier 406, the example second multiplier 408, the example third multiplier 410, the example third subtractor 412, the example tracking error value selector 414, the example data storage 416, the example fourth multiplier 418, and the example fourth subtractor 420 of FIG. 3 and/or FIG. 4 and/or more generally the example PFC controller circuit 122 of FIG. 1 and FIG. 3 may be implemented by hardware, software, firmware and/or any combination of hardware, software and/or firmware. Thus, for example, any of the example first voltage sensor 302, the example current sensor 304, the example software phase locked loop (SPLL) determiner 306, the example sine analyzer 308, the example compensation and adjustment calculator 310, the first example subtractor 312, the example current compensator 314, the example second voltage sensor 316, the example notch filter 318, the example reference bus voltage source 320, the third example voltage sensor 322, the second example subtractor 324, the example voltage compensator 326, the example reference current calculator 328, the example feed forward duty ratio determiner 330, the example compensating current determiner 402, the example load adjustment determiner 404, the example first multiplier 406, the example second multiplier 408, the example third multiplier 410, the example third subtractor 412, the example tracking error value selector 414, the example data storage 416, the example fourth multiplier 418, and the example fourth subtractor 420 of FIG. 3 and/or FIG. 4 and/or more generally the example PFC controller circuit 122 of FIG. 1 and FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first voltage sensor 302, the example current sensor 304, the example software phase locked loop (SPLL) determiner 306, the example sine analyzer 308, the example compensation and adjustment calculator 310, the first example subtractor 312, the example current compensator 314, the example second voltage sensor 316, the example notch filter 318, the example reference bus voltage source 320, the third example voltage sensor 322, the second example subtractor 324, the example voltage compensator 326, the example reference current calculator 328, the example feed forward duty ratio determiner 330, the example compensating current determiner 402, the example load adjustment determiner 404, the example first multiplier 406, the example second multiplier 408, the example third multiplier 410, the example third subtractor 412, the example tracking error value selector 414, the example data storage 416, the example fourth multiplier 418, and the example fourth subtractor 420 of FIG. 3 and/or FIG. 4 and/or more generally the example PFC controller circuit 122 of FIG. 1 and FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example PFC controller circuit 122 of FIG. 1 and/or FIG. 3 and/or the example PFC converter system 100 of FIG. 1 and FIG. 3 may include one or more elements, processes and/or devices in addition to, or instead of, those illustrated in FIG. 1, FIG. 3, and/or FIG. 4 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
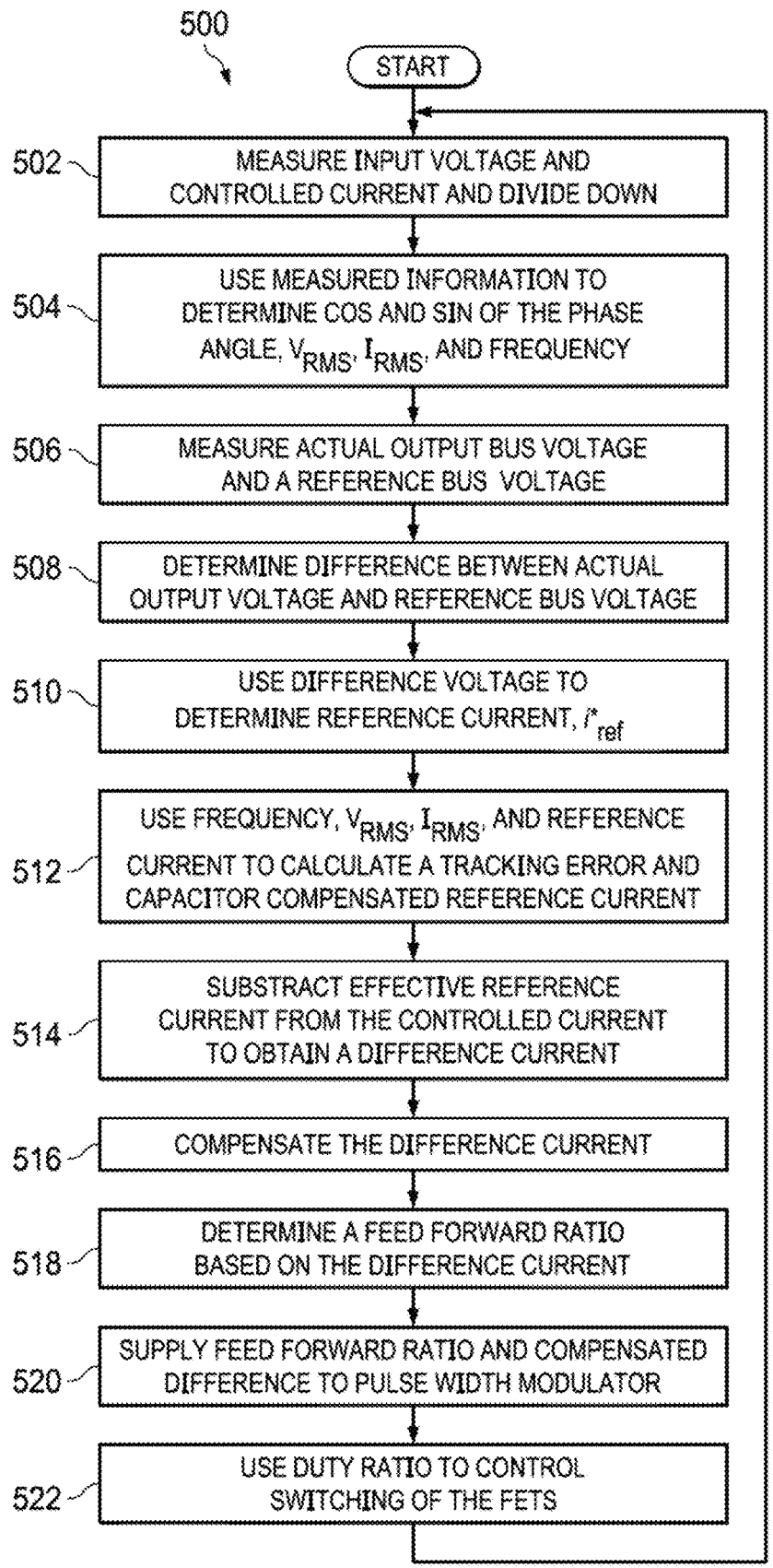
FIG. 5 illustrates a flowchart representative of an example method which may be performed by the power factor correction controller circuit of FIG. 1 and FIG. 3 to correct the power factor of the power factor correction converter system of FIG. 1.
Figure 6:
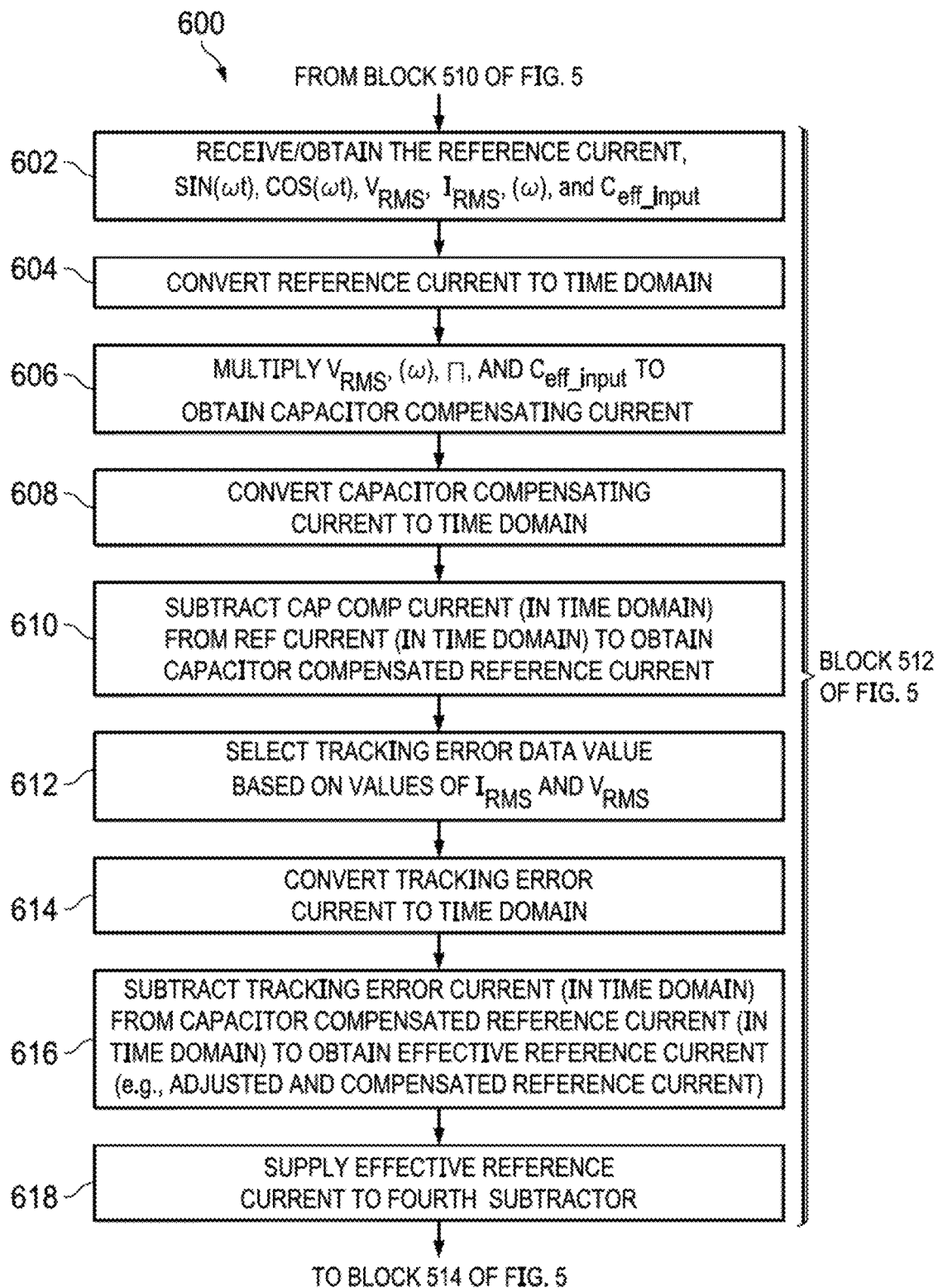
FIG. 6 is a flowchart representative of an example method which may be performed by the example compensation and adjustment calculator to determine the further adjusted compensating capacitor current to be used to offset a capacitor current associated with the example effective capacitance seen at the input of the power factor correction converter system of FIG. 1 and FIG. 3 and to offset changes to the power factor caused by changes in a current drawn by the load.

A flowchart representative of example hardware logic or machine readable instructions for implementing the PFC controller circuit 122 of FIG. 1, FIG. 3, and FIG. 4 is shown in FIG. 5 and in FIG. 6. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIG. 5 and in FIG. 6, many other methods of implementing the example PFC controller circuit 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example method 500 that may be performed by the example PFC controller circuit 122 is represented by the flowchart shown in FIG. 5. With reference to FIG. 1 and FIG. 2 and the associated written descriptions, the example method 500 begins at a block 502 at which the example first voltage sensor 302 senses the AC input voltage, $V_{ac}$, and adjusts/scales the voltage to a level appropriate for usage in the PFC controller circuit 122. In addition, the example first current sensor 304 senses/measures the controlled current, $i_{controlled}$, and adjusts the controlled current, $i_{controlled}$, to a level appropriate for usage in the PFC controller circuit 122 (also at the block 502). The SPLL 306 uses the measured (and adjusted) input voltage to determine the phase angle of the input voltage and to determine the sine and cosine of the phase angle ($\omega t$) (e.g., sin ($\omega t$) and cos ($\omega t$)) (block 504). In addition, the sine analyzer 308 determines the root mean square voltage, $V_{rms}$, the root mean square input current, $I_{rms}$, and the frequency, $\omega$, of the AC input voltage, $V_{ac}$, (also at the block 504). The actual bus voltage, $V_{bus}$, is measured by the example second voltage sensor 316 and the reference bus voltage, $V_{busref}$ 320 is measured by the example third voltage sensor 322 (block 506). The example second subtractor 324 determines a difference voltage between the actual bus voltage, $V_{bus}$, and the reference bus voltage, $V_{busref}$ 320 (see block 508). The difference/error voltage is used by the example voltage compensator 326 and the example reference determiner 328 (in the manner described with reference to FIG. 3) to derive the magnitude of the reference current, $i^*_{ref}$ (see block 510).

In some examples, the example compensation and adjustment calculator 310 uses the magnitude of the reference current, $i^*_{ref}$, the outputs supplied by the example SPLL determiner 306 (e.g., the sin ($\omega t$) and the cos ($\omega t$)), and the outputs supplied by the sine analyzer 308 (e.g., the root mean square of the input voltage, $V_{rms}$, the root mean square of the input current, $I_{rms}$, the frequency $\omega$ of the input voltage, $V_{ac}$, and also the effective capacitance, $C_{eff\_input}$, multiplied by a constant, (e.g., 1.414*$C_{eff\_input}$), to determine the tracking error and capacitor compensated reference current, $i_{ref\_cap\_comp+TE\_comp}$ (also referred to as the effective reference current, $i_{ref}$eff) (see block 512). The compensation and adjustment calculator 310 supplies the tracking error and capacitor compensated reference current, $i_{ref\_cap\_comp+TE\_comp}$ to the first example subtractor 312 which subtracts the tracking error and capacitor compensated reference current, $i_{ref\_cap\_comp+TE\_comp}$ from the divided down value of the sensed, actual controlled current, $i_{controlled}$, to obtain the difference current, $i_{diff}$ (see block 514). The difference current, $i_{diff}$, is supplied to the example current compensator 314. The example current compensator 414 ensures the controlled current, $i_{controlled}$, follows $i_{ref\_cap\_comp+TE\_comp}$ (see block 516). The output of the current compensator 314 is then fed to the feed forward duty ratio determiner 330 which determines an appropriate duty ratio at which to drive the example gates 120A-120H of the example FETs 114A-114H (see block 518). The duty ratio used to drive the gates 120A-120H is selected such that the output bus voltage, $V_{bus}$, remains stable and can be further selected to further improve the power factor. As described above, the duty ratio determiner 330 also determines a duty ratio that will cause the value of the controlled current, $i_{controlled}$, to be nearly or nearly equal to the tracking error and capacitor compensated reference current, $i_{ref\_cap\_comp+TE\_comp}$. The feed forward duty ratio determiner 330 supplies the determined duty ratio to the example switch controller/PWM 118 (see block 520). The switch controller/PWM 118 uses the information to drive the gates 120A-120H of the FETS 114A-114H in a manner that adjusts the controlled current, $i_{controlled}$, to equal or nearly equal the tracking error and capacitor compensated reference current, $i_{ref\_cap\_comp+TE\_comp}$. As described above, causing the controlled current, $i_{controlled}$, to equal or nearly equal the tracking error and capacitor compensated reference current, $i_{ref\_cap\_comp+TE\_comp}$, causes the input current, $i_{input}$, to contain little or no reactive components and to be in, or nearly in, phase with the AC input voltage, $V_{ac}$ (see block 522). As a result, with the aid of the PFC controller circuit 122, the power factor of the PFC converter system 100 is unity (or nearly unity) and the actual DC output voltage, $V_{bus}$, available to the load 105 is stable.

An example method 600 that may be performed by the example compensation and adjustment calculator 310 of the example PFC controller circuit 122 is represented by the flowchart shown in FIG. 6. In some examples, the method 600 implements the block 512 of the method 500 of FIG. 5. With reference to FIGS. 1, FIG. 3, FIG. 4, FIG. 5, FIG. 6, and the associated written descriptions, the example method 600 begins at a block 602 at which the example compensation and adjustment calculator 310 obtains/receives the sin ($\omega$t), the cos ($\omega$t) from the output of the example SPLL 306 and also receives/obtains, from the example sine analyzer 308, the root mean square ($V_{rms}$) of the AC input voltage, $v_{ac}$, the root mean square ($I_{rms}$) of the input current, $i_{input}$, the value of the frequency, $\omega$, and the value of the effective capacitance $C_{eff\_input}$ multiplied by the constant 1.414 ($C_{eff\_input}$*1.414). In addition, the compensation and adjustment calculator 310 receives/obtains a signal representing the magnitude of the reference current $i^*_{ref}$ from the reference current calculator 328 (see also block 602). An example first multiplier 406 of the example compensating current determiner 402 (of the compensation and adjustment calculator 310) multiplies the sin ($\omega$t) signal with the magnitude of the reference current, $i^*_{ref}$, to obtain a signal representing a time domain version of the reference current, $i_{ref}$ (see block 604). In addition, an example second multiplier 408 multiples the value of $V_{rms}$ received from the sine analyzer 308, the value of the frequency ($\omega$) received from the sine analyzer 308 (see FIG. 3), and the value of the effective input capacitance, $C_{eff\_input}$, of the PFC converter 100 multiplied by a constant ("1.414") to determine the value of the magnitude of the capacitor compensating current, $i_{cap\_comp}$ (see block 606). In some such examples, the value of the capacitor compensating current, $i_{cap\_comp}$, is equal to $V_{rms}$*($\omega$)*1.414*$C_{eff\_input}$." The second multiplier 408 supplies the value of the capacitor compensating current, $i_{cap\_comp}$, to an example third multiplier 410. The third multiplier 410 multiplies the capacitor compensating current, $i_{cap\_comp}$, by a cos ($\omega$t) signal received from the example sine analyzer 308 to thereby obtain the value of the capacitor compensating current, $i_{cap\_comp}$, in the time domain (see block 608). An example third subtractor 412 subtracts the time domain value of the capacitor compensating current, $i_{cap\_comp}$, from the time domain value of the reference current, $i_{ref}$, to determine the value of the capacitor compensated reference current, $i_{ref\_cap\_comp}$ (see block 610).

Referring still to FIG. 6, in some examples, the example load adjustment determiner 404 (see FIG. 4) of the example compensation and adjustment calculator 310 includes an example tracking error data selector 414, an example data storage 416, and an example fourth multiplier 418. The example tracking error data selector 414 uses the values of $I_{rms}$ and $V_{rms}$ supplied by the sine analyzer 308 (see FIG. 3) in the manner described above with reference to Table 1 to select a tracking error data value from the data storage 416 (see block 612). In some such examples, the data storage 416 is used to store data showing how tracking error current changes as the values of $V_{rms}$ and $I_{rms}$ change (e.g., a table such as Table 1). The selected tracking error data value is supplied by the tracking error data selector 416 to the fourth multiplier 416 which multiplies the tracking error current value by a cos ($\omega$t) signal received from the example sine analyzer 308 to determine the tracking error current, $i_{TE}$ in the time domain (see block 614). In some examples, the example fourth subtractor 420 subtracts the tracking error current, $i_{TE}$ comp, from the capacitor compensated reference current, $i_{ref\_cap\_comp}$, to determine the tracking error and capacitor compensated reference current, $i_{ref\_cap\_comp+TE\_comp}$. (e.g., $i_{ref\_cap\_comp}-I_{TE\_comp}=i_{ref\_cap\_comp+TE\_comp}$) (see block 616). Next, the method 600 of FIG. 6 returns to block 512 of FIG. 5 at which the tracking error and capacitor compensated reference current, $i_{ref\_cap\_comp+TE\_comp}$, is supplied to the example first subtractor 312 (see FIG. 3) for use in determining the difference current, $i_{diff}$, as described above (see FIG. 5).

Figure 7:
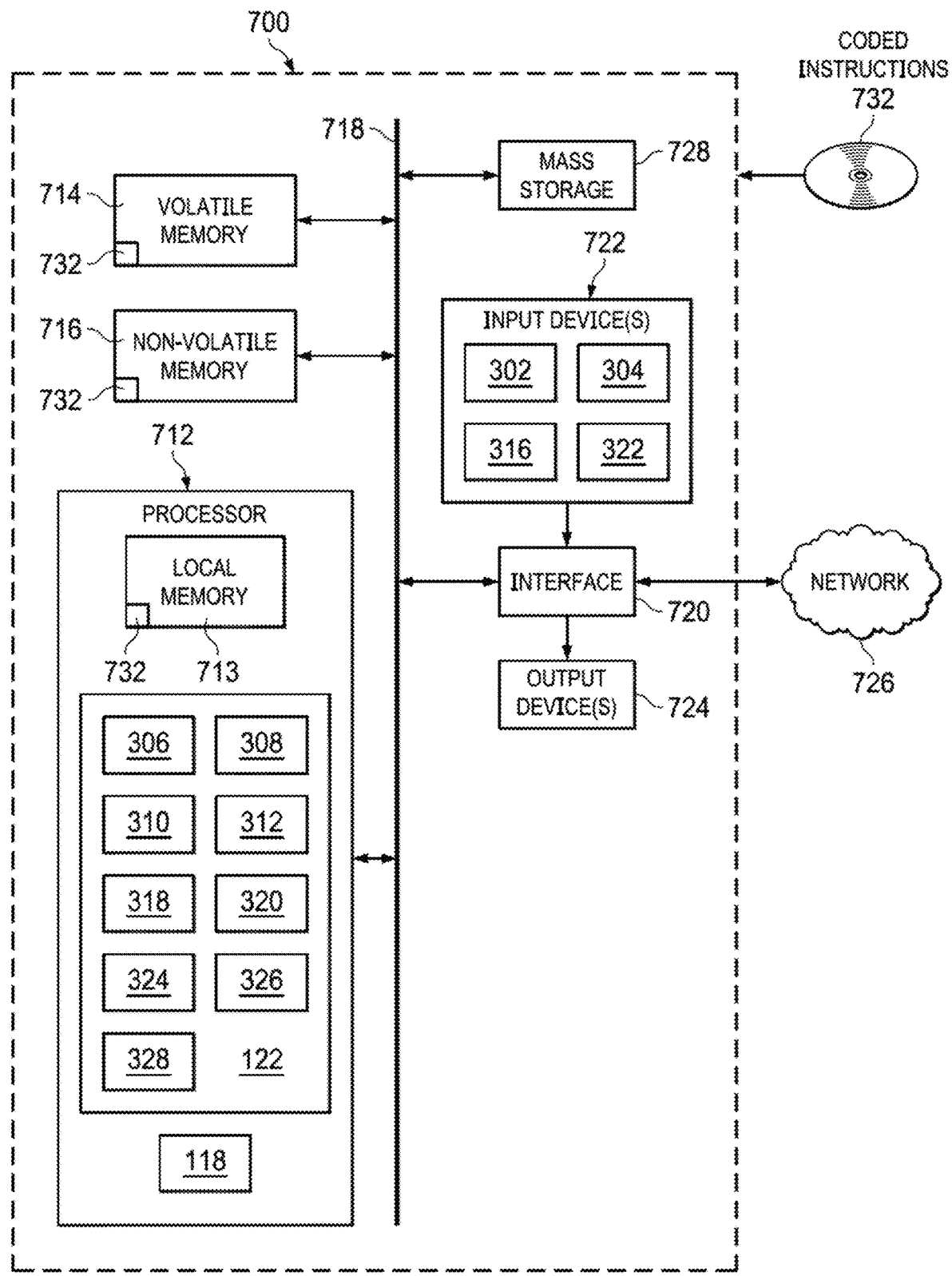
FIG. 7 is a block diagram of an example processing platform structured to execute the instructions of FIGS. 5 and 6 to implement the power factor correction control circuit of FIG. 1 and FIG. 3 and the compensation and adjustment calculator of FIG. 4, respectively.

FIG. 7 is a block diagram of an example processor platform 700 structured to execute the instructions of FIG. 5 and FIG. 6 to implement the PFC controller circuit 122 of FIGS. 1, 3 and 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements at least some aspects of the example PFC controller circuit 122 including the example SPLL 306, the sine analyzer 308, any and/or all components of the example compensation and adjustment calculator 310, the example first subtractor 312, the example notch filter 318, the example second subtractor 324, the example voltage compensator 326, the example reference current determiner 328, the example feed forward duty ratio determiner 330 and/or the example switch controller 118.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a keyboard, a button, a mouse, a touchscreen, a track-pad, a trackball, isopoint and/or a voice recognition system. In some examples, the input devices can be implemented with the example first voltage sensor 302, the example first current sensor 304, the example second voltage sensor 316, and/or the example third voltage sensor 322.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and 6 may be stored in the mass storage device 728, in the volatile memory 714, in the non-volatile memory 716, and/or on a removable non-transitory computer readable storage medium such as a CD or DVD.

Figure 8A:
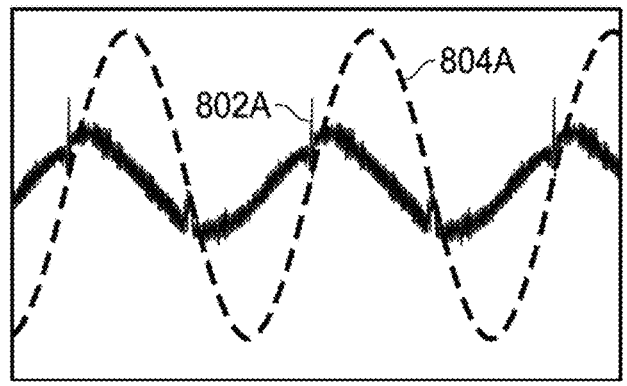
FIGS. 8A, 8B and 8C are graphs illustrating relationships between an input current waveform and an output current waveform when controlled using first (FIG. 8A), second (FIG. 8B), and third (FIG. 8C) control schemes.
Figure 8B:
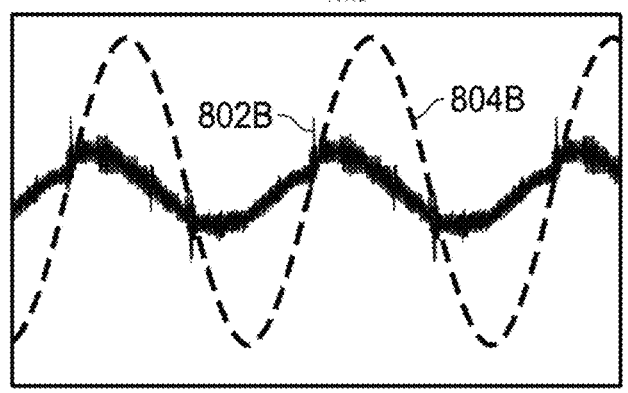
Figure 8C:
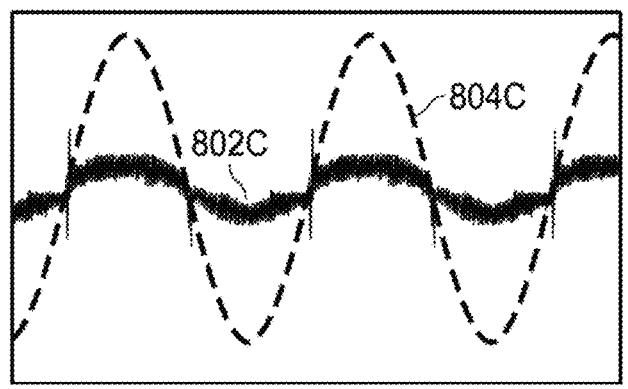

From the foregoing, it will be appreciated that example methods, apparatus and articles of manufacture have been disclosed that provide improved power factor correction for AC/DC converters. As illustrated in FIGS. 8A, 8B and 8C, the power factor correction controller circuit 120 of FIGS. 1 and 3 not only provides improved power factor correction but also provides a more stable output current. FIGS. 8A, 8B and 8C provide graphical illustrations of the relationship between the root mean square of the input current waveform 802A, 802B, 802C and the AC input voltage waveform 804A, 804B, 804C under different conditions. In FIG. 8A, control of the FETS 114A-114H is determined using a duty-ratio feedforward control scheme involving the feed forward duty ratio determiner 330. In FIG. 8A, the root mean square of the input current, denoted "$I_{rms}$," is equal to 0.5368 Amps. In FIG. 8B, control of the FETS 114A-114H is determined using a combined duty-ratio feedforward control with a capacitor compensating current control scheme. In FIG. 8B, the root mean square of the input current, $I_{rms}$, is equal to 0.4118 Amps. In FIG. 8C, control of the FETS 114A-114H is determined using a combined duty-ratio feedforward control with a capacitor compensating current control and tracking error compensation control scheme as disclosed herein. In FIG. 8C, the root mean square of the input current, $I_{rms}$, is equal to 0.2983 Amps. In FIG. 8C, duty-ratio feedforward control, a capacitor compensating current and a tracking error compensating current are used to control the FETS 114A-114H of the power stage 112. By comparing the graphs of FIGS. 8A, 8B and 8C, it is apparent that using the control scheme that includes duty ratio feedforward control with a capacitor compensating current and a tracking error compensating current, results in an improved power factor as the input waveform of FIG. 8C is more in phase with the AC input voltage waveform of FIGS. 8A and 8B.

Figures 9, 10:
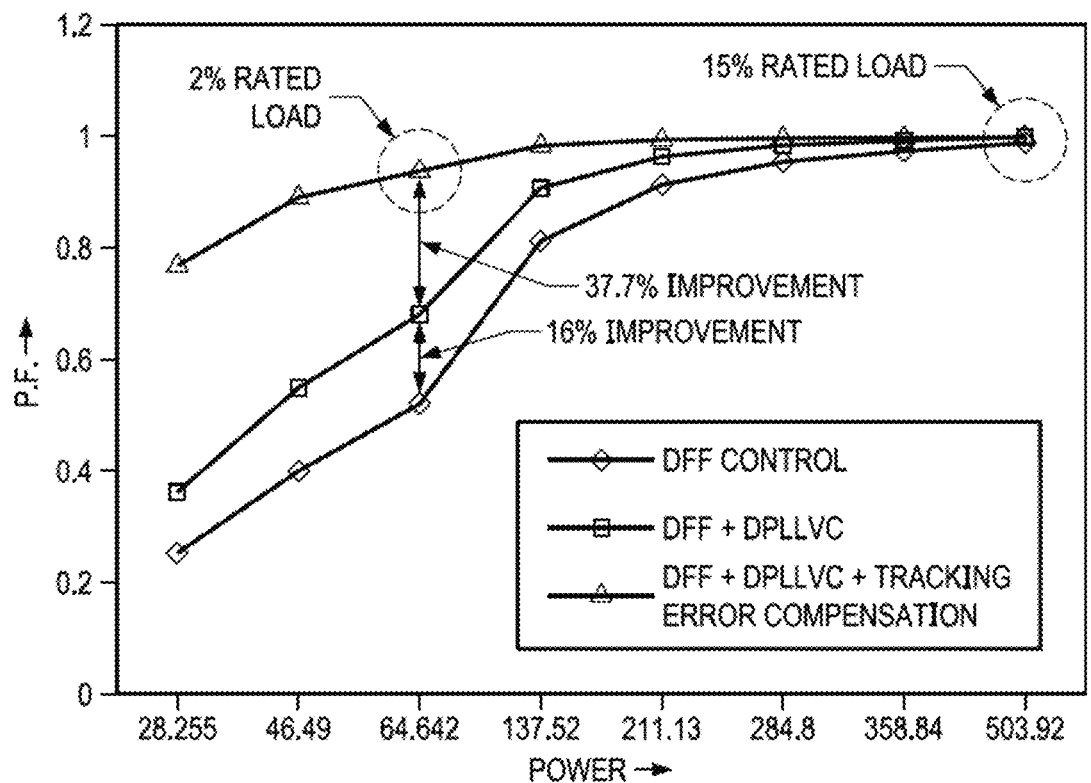
FIG. 9 is a graph illustrating the effects of the first, second and third control schemes of FIGS. 8A, 8B and 8C on the power factor of the AC/DC converter system of FIG. 1 under changing load conditions.
FIG. 10 is a table showing the power factor improvements achieved using the power factor correction controller circuit of FIG. 1 and FIG. 3.

FIG. 9 is a graph illustrating changes in power factor as output power changes when using each of the three types of controls schemes of FIGS. 8A, 8B, and 8C (e.g., duty ratio feedforward alone, duty ratio feedforward with capacitor compensating current (also referred to as DPLLVC (digital phase locked loop based vector cancellation)), and duty ratio feedforward with DPLLVC and tracking error compensation. As illustrated in FIG. 9, when the load is at 15% or greater, all of the illustrated techniques achieve a unity (or near unity) power factor, but as the output power decreases due to a lower load rating, the power factor degrades. As illustrated, the power factor degrades dramatically, when only a duty ratio feedforward control scheme is used, whereas the power factor degrades less when a duty ratio feedforward control scheme with DPLLVC is used and the power factor degrades the least when a duty ratio feedforward control scheme with DPLLVC and tracking error compensation is employed, as disclosed herein. In fact, a 16% improvement in power factor is achieved when a duty ratio feedforward control scheme with DPLLVC is employed as compared to using only duty ratio feedforward control, and a further 37.7% improvement in power factor is achieved when a duty ratio feedforward control scheme with DPLLVC and Tracking Error (TE) compensation is employed.

FIG. 10 provides further evidence of the improvement in power factor achieved by using a capacitor compensating current as a basis for controlling the current drawn by the power stage 112. As illustrated, at an AC input voltage of 230 volts and a capacitor current, $i_{cap\_comp}$ equal to 0.04, the power factor was measured at different power settings. The power is related to the amount of load current being drawn, such that at lower power, lower current is being drawn by the load 105 (see FIG. 1). As illustrated, when the power is at higher levels, the power factor achieved without and without using a capacitor compensating current is somewhat comparable (e.g., a power factor improvement of 1.8% is achieved when operating at a high output power of 617 Watts). However, as the power drops, the power factor achieved when using a capacitor compensating current to control the power stage 112 is greatly improved (e.g., a power factor improvement of 22.6% is achieved when operating at a low output power of 90 Watts).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system, comprising:
   a filter circuit configured to:
      receive an input voltage; and
      provide an output current;
   a power conversion circuit coupled to the filter circuit and configured to:
      receive the output current; and
      provide an output voltage; and
   a power factor correction controller circuit configured to:
      receive a signal representing the input voltage;
      receive a signal representing the output current;
      determine a tracking error associated with the power conversion circuit based on the input voltage and the output current; and
      determine an adjustment to the output current based on the tracking error.

2. The system of claim 1, wherein the power factor correction controller circuit is configured to:
   determine a capacitor current based on the input voltage and a capacitance of the filter circuit; and
   determine the adjustment to the output current based on the capacitor current in addition to the tracking error.

3. The system of claim 2, wherein the power factor correction controller circuit is configured to:
determine a phase angle of the input voltage based on the input voltage; and
determine a first signal representing the capacitor current in a time domain based on the capacitor current and the phase angle.

4. The system of claim 3, wherein the power factor correction controller circuit is configured to determine the phase angle based on a phase locked loop.

5. The system of claim 3, wherein the power factor correction controller circuit is configured to:
receive a signal representing a reference value of the output voltage;
determine a reference current based on the reference value and the output voltage; and
determine a second signal representing the reference current in the time domain based on the reference current and the phase angle.

6. The system of claim 5, wherein the power factor correction controller circuit is configured to determine a third signal representing the tracking error in the time domain based on the tracking error and the phase angle of the input voltage.

7. The system of claim 6, wherein to determine the adjustment to the output current based on the capacitor current in addition to the tracking error, the power factor correction controller circuit is configured to determine the adjustment based on the first signal, the second signal, and the third signal.

8. The system of claim 1, wherein to determine the tracking error, the power factor correction controller circuit is configured to query a look up table based on the input voltage and the output current to determine the tracking error.

9. The system of claim 1, wherein the filter circuit is configured to receive the input voltage through a first line and a second line, and the filter circuit comprises a capacitor coupled between the first line and the second line.

10. The system of claim 1, wherein the power conversion circuit comprises a set of power switches, and wherein the system comprises a switch control circuit configured to:
receive a signal representing the adjustment to the output current; and
control the set of power switches based on the adjustment to the output current.

11. A method, comprising:
receiving, by a power factor correction controller circuit, a signal representing an input voltage of a filter circuit of a power conversion circuit;
receiving, by the power factor correction controller circuit, a signal representing an output current of the filter circuit;
determining, by the power factor correction controller circuit, a tracking error associated with the power conversion circuit based on the input voltage and the output current; and
determining an adjustment to the output current based on the tracking error.

12. The method of claim 11, further comprising:
determining a capacitor current based on the input voltage and a capacitance of the filter circuit; and
determining the adjustment to the output current based on the capacitor current in addition to the tracking error.

13. The method of claim 12, further comprising:
determining a phase angle of the input voltage based on the input voltage; and
determining a first signal representing the capacitor current in a time domain based on the capacitor current and the phase angle.

14. The method of claim 13, further comprising:
receiving a signal representing a reference value of an output voltage of the power conversion circuit;
determining a reference current based on the reference value and the output voltage; and
determining a second signal representing the reference current in the time domain based on the reference current and the phase angle.

15. The method of claim 14, further comprising determining a third signal representing the tracking error in the time domain based on the tracking error and the phase angle of the input voltage.

16. The method of claim 15, wherein determining the adjustment to the output current based on the capacitor current in addition to the tracking error comprises determining the adjustment based on the first signal, the second signal, and the third signal.

17. The method of claim 11, wherein determining the tracking error comprises querying a look up table based on the input voltage and the output current to determine the tracking error.

18. The method of claim 11, wherein the filter circuit receives the input voltage through a first line and a second line, and the filter circuit comprises a capacitor coupled between the first line and the second line.

19. The method of claim 11, wherein the power conversion circuit comprises a set of power switches, and wherein the method further comprises:
receiving, by a switch control circuit, a signal representing the adjustment to the output current; and
controlling, by the switch control circuit, the set of power switches based on the adjustment to the output current.

20. The method of claim 19, wherein the tracking error is associated with a bandwidth of the switch control circuit.

* * * * *